US012639813B2

(12) United States Patent
Noji

(10) Patent No.: US 12,639,813 B2
(45) Date of Patent: May 26, 2026

(54) DYNAMIC IMAGE ANALYSIS APPARATUS AND RECORDING MEDIUM TO DETERMINE PULMONARY BLOOD FLOW RATE

(71) Applicant: Konica Minolta, Inc., Tokyo (JP)

(72) Inventor: Sho Noji, Kokubunji (JP)

(73) Assignee: KONICA MINOLTA, INC., Tokyo (JP)

( * ) Notice: Subject to any disclaimer, the term of this patent is extended or adjusted under 35 U.S.C. 154(b) by 344 days.

(21) Appl. No.: 18/325,441

(22) Filed: May 30, 2023

(65) Prior Publication Data

US 2023/0394657 A1 Dec. 7, 2023

(30) Foreign Application Priority Data

Jun. 1, 2022 (JP) ................................. 2022-089320

(51) Int. Cl.
G06T 7/00 (2017.01)
A61B 6/50 (2024.01)

(52) U.S. Cl.
CPC .. G06T 7/0012 (2013.01); G06T 2207/10116 (2013.01); G06T 2207/20021 (2013.01); G06T 2207/30061 (2013.01); G06T 2207/30104 (2013.01)

(58) Field of Classification Search
CPC ......... G06T 7/0012; G06T 2207/10116; G06T 2207/20021; G06T 2207/30061; G06T 2207/30104; G06T 2207/20084; G06T 5/70; G06T 2207/20076; G06T 2207/20081; G06T 2207/30048; G06T 7/12; G06T 7/136; G06T 7/248; G06T 7/254; G06T 7/62; G06T 7/11; G06T 2207/10016; G06T 2207/10081; G06T 7/194; A61B 6/507; A61B 6/5217; G06V 10/26; G06V 10/82; G16H 30/40
See application file for complete search history.

(56) References Cited

U.S. PATENT DOCUMENTS

| | | | |
|---|---|---|---|
| 2016/0078309 A1* | 3/2016 | Feldman | G06T 7/50 |
| | | | 382/131 |
| 2016/0350923 A1* | 12/2016 | Muraoka | G06T 7/20 |
| 2020/0297240 A1* | 9/2020 | Shimamura | G06T 7/0016 |

FOREIGN PATENT DOCUMENTS

| | | |
|---|---|---|
| JP | 5136562 B2 | 2/2013 |
| JP | 2017176400 A | 10/2017 |

OTHER PUBLICATIONS

JPO Notice of Reasons for Refusal for corresponding JP Application No. 2022-089320; Issued Dec. 9, 2025.

* cited by examiner

*Primary Examiner* — Siamak Harandi
(74) *Attorney, Agent, or Firm* — CANTOR COLBURN LLP

(57) ABSTRACT

A dynamic image analysis apparatus including a hardware processor that: obtains a chest dynamic image obtained by dynamic radiographing through radiation; extracts a lung field region from the dynamic image; calculates a feature amount about a blood flow rate, based on the lung field region; and limits a value of the calculated feature amount about the blood flow rate.

8 Claims, 15 Drawing Sheets

START

INPUT PATIENT INFORMATION — S1

SET RADIATION IRRADIATION CONDITIONS AND IMAGE READING CONDITIONS — S2

S3 — RADIATION IRRADIATION INSTRUCTION?

NO

YES

DYNAMIC RADIOGRAPHING — S4

STORE DYNAMIC IMAGE — S5

DISPLAY DYNAMIC IMAGE — S6

S7 — OK? — NO

YES — S8

TRANSMIT DYNAMIC IMAGE TO DIAGNOSTIC CONSOLE

REMOVE DYNAMIC IMAGE — S9

END

PULMONARY BLOOD FLOW
ANALYSIS PROCESS

OBTAIN CHEST DYNAMIC IMAGE ⟶ S11

GENERATE PULMONARY BLOOD FLOW
SUMMARIZED IMAGE ⟶ S12

UPPER LIMIT VALUE SETTING PROCESS ⟶ S13

ANALYSIS REGION SETTING PROCESS ⟶ S14

CALCULATE LEFT–TO–RIGHT RATIO OF
PULMONARY BLOOD FLOWS INCLUDING
BACK OF ORGAN ⟶ S15

DISPLAY LEFT–TO–RIGHT RATIO OF
PULMONARY BLOOD FLOWS ⟶ S16

END

M

13

BLOOD

LUNGS

RADIATION

MEASURE AREA OF EACH SLICE

UPPER END: APEX AREA OF LUNG

LOWER END: BASE OF LUNG

■ : RIGHT LUNG FIELD REGION    □ : LEFT LUNG FIELD REGION
■ : RIGHT HIDDEN REGION    ■ : LEFT HIDDEN REGION

FIG.15
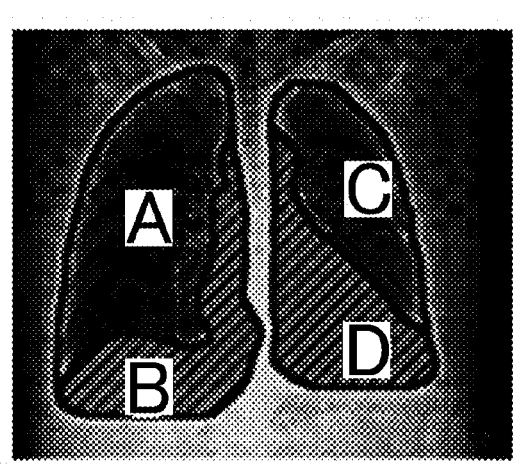
FIG.16
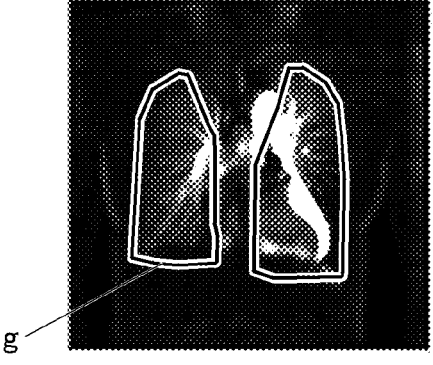
FIG.17

Figure 18:
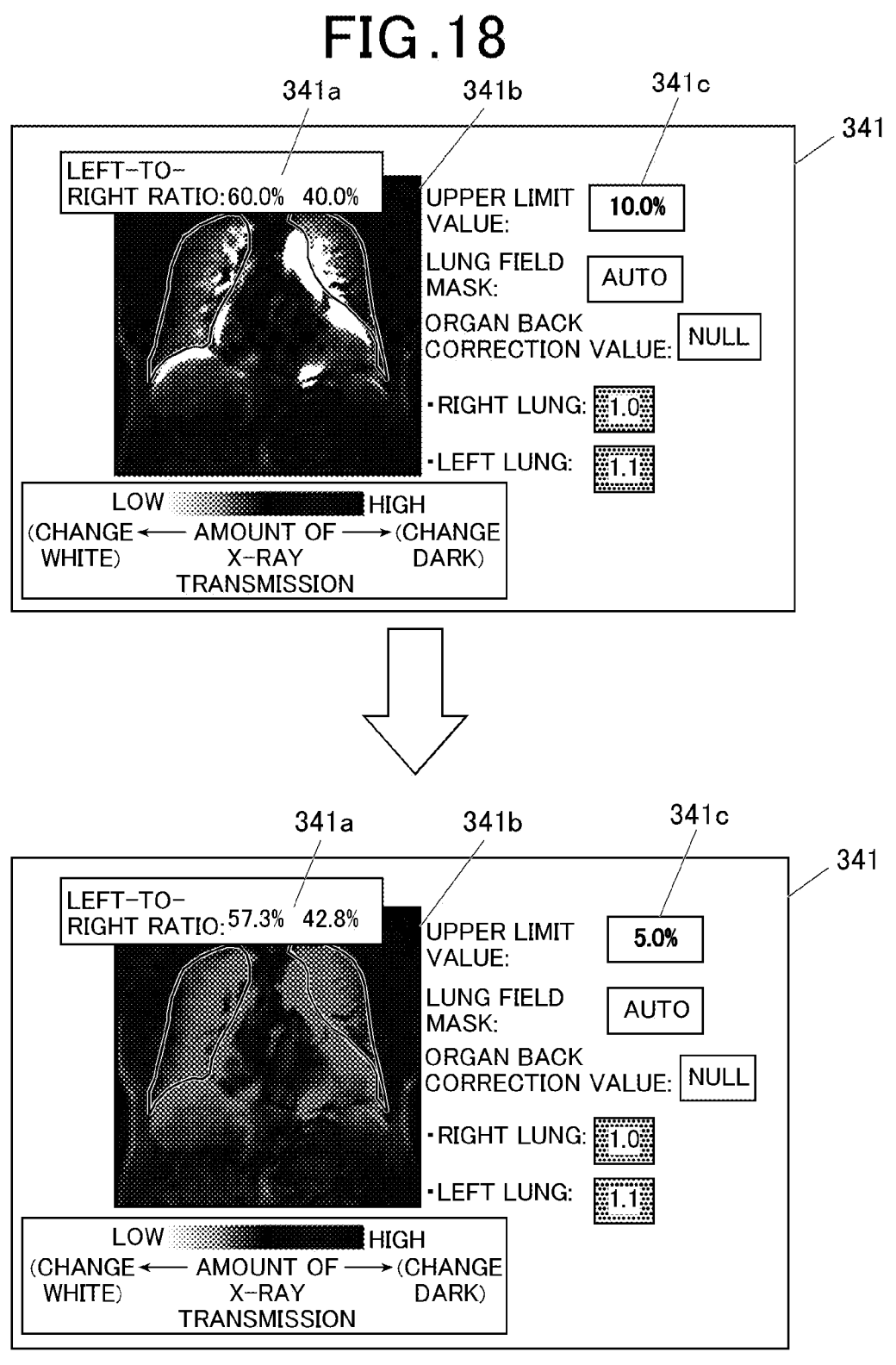

LEFT-TO-
RIGHT RATIO:60.0%  40.0%

UPPER LIMIT
VALUE:                    10.0%

LUNG FIELD
MASK:                     AUTO

ORGAN BACK
CORRECTION VALUE:         NULL

·RIGHT LUNG:    1.0

·LEFT LUNG:     1.1

LOW                   HIGH
(CHANGE ←—— AMOUNT OF ——→ (CHANGE
WHITE)        X-RAY           DARK)
           TRANSMISSION 341a                341b                341c

341

LEFT-TO-
RIGHT RATIO:57.3%  42.8%

UPPER LIMIT
VALUE:                    5.0%

LUNG FIELD
MASK:                     AUTO

ORGAN BACK
CORRECTION VALUE:         NULL

·RIGHT LUNG:    1.0

·LEFT LUNG:     1.1

LOW                   HIGH
(CHANGE ←—— AMOUNT OF ——→ (CHANGE
WHITE)        X-RAY           DARK)
           TRANSMISSION

FIG.19
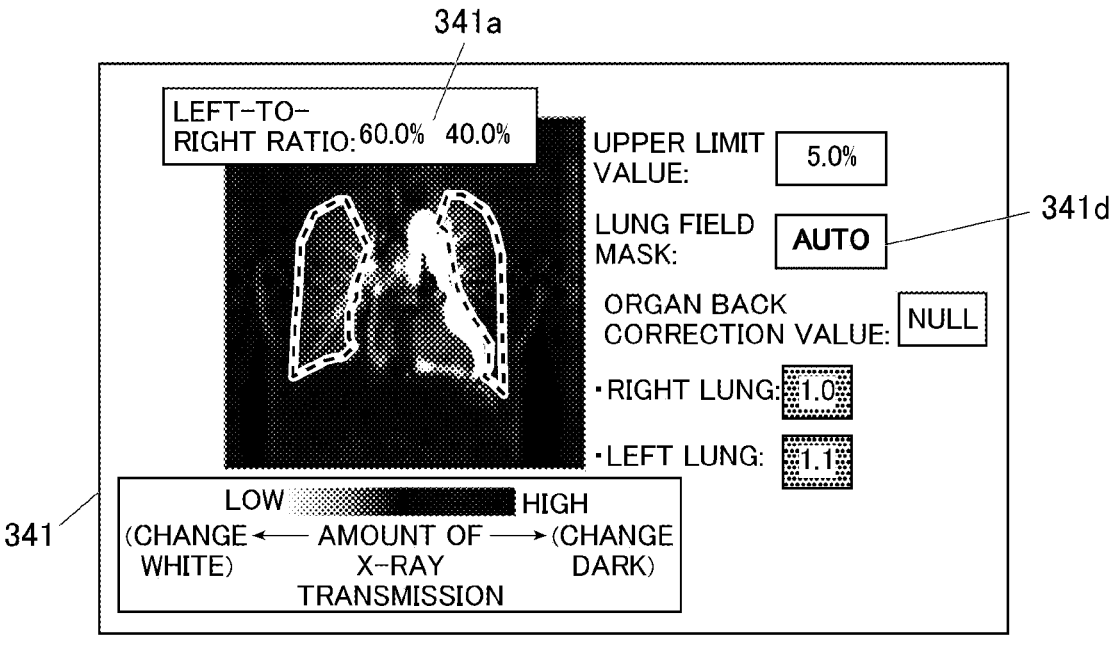
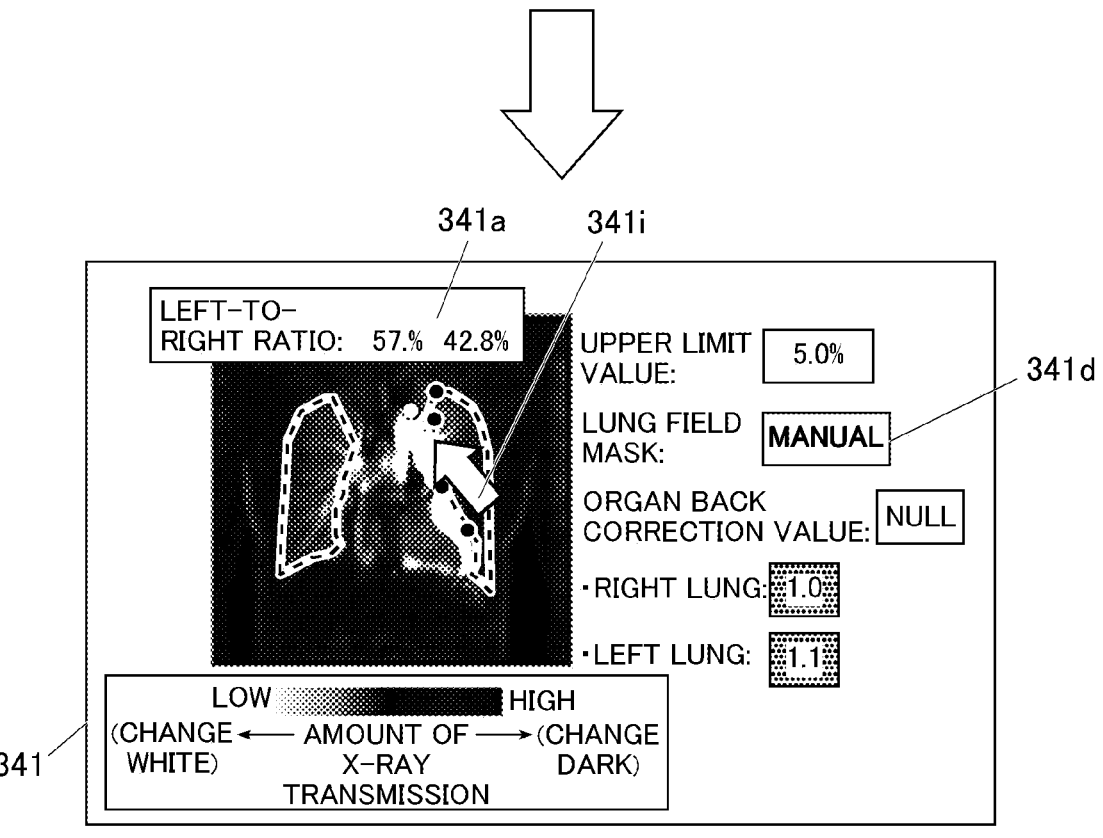

DYNAMIC IMAGE ANALYSIS APPARATUS AND RECORDING MEDIUM TO DETERMINE PULMONARY BLOOD FLOW RATE

CROSS-REFERENCE TO RELATED APPLICATIONS

The present invention claims priority under 35 U.S.C. § 119 to Japanese Patent Application No. 2022-089320 filed on Jun. 1, 2022, the entire contents of which being incorporated herein by reference.

TECHNICAL FIELD

The present invention relates to a dynamic image analysis apparatus and a recording medium.

DESCRIPTION OF THE RELATED ART

Conventionally, a technique of analyzing the pulmonary blood flow based on a chest dynamic image has been proposed.

For example, JP 5136562B describes a technique that conforms the shape (including blood vessels) of the lung field region in each of the frame images by applying a warping process (alignment process) to the frame images of a chest dynamic image, subsequently extracts a blood vessel region, and calculates the amount of change in concentration between the frame images, based on the blood vessel region, thus calculating the blood flow feature amount.

SUMMARY OF THE INVENTION

However, blood vessels move three-dimensionally. Accordingly, it is difficult to correctly perform alignment in a two-dimensional chest dynamic image, and it is difficult to accurately calculate the blood flow feature amount.

Typically, a pulmonary blood flow scintigraphy has been known as a modality for evaluating the left-to-right ratio (blood flow ratio of left and right lungs) of a pulmonary blood flow. The pulmonary blood flow scintigraphy evaluates the blood flow ratio of pulmonary peripheral vessels between the left and right lungs. For evaluation that is with a chest dynamic image and is equivalent to that by the pulmonary blood flow scintigraphy, for example, a method of calculating the left-to-right ratio of pulmonary blood flows, based on the feature amount about pulmonary blood flows in a region obtained by excluding a region of specific blood vessels (main vessels) is used. However, the peripheral vessels also exist on the back of the main vessels in an overlaid manner. Consequently, if the region of the main vessels is eliminated from the evaluation region, correct evaluation cannot be achieved.

The present invention has an object to accurately calculate a feature amount about a pulmonary blood flow rate with main vessels being excluded, based on a chest dynamic image.

To achieve at least one of the abovementioned objects, according to an aspect of the present invention, a dynamic image analysis apparatus reflecting one aspect of the present invention includes:

a hardware processor that: obtains a chest dynamic image obtained by dynamic radiographing through radiation; extracts a lung field region from the dynamic image; calculates a feature amount about a blood flow rate, based on the lung field region; and limits a value of the calculated feature amount about the blood flow rate.

To achieve at least one of the abovementioned objects, according to an aspect of the present invention, a recording medium reflecting one aspect of the present invention is a non-transitory computer readable recording medium storing a program causing a computer to perform:

obtaining a chest dynamic image obtained by dynamic radiographing through radiation;

extracting a lung field region from the dynamic image;

calculating a feature amount about a blood flow rate, based on the lung field region; and limiting a value of the calculated feature amount about the blood flow rate.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 15 is a diagram for illustrating a region used to calculate an organ back correction coefficient.

FIG. 16 shows an example of an analysis result screen displaying the left-to-right ratio of pulmonary blood flows.

FIG. 17 shows an example of displaying only the lung field mask for the blood flow ratio without discrimination of a region behind an organ.

FIG. 18 shows change of the analysis result screen when the upper limit value is changed by user operation.

FIG. 19 shows change in the analysis result screen when generation of the lung field mask for the blood flow ratio is changed from an automatic mode to a manual mode by user operation.

DETAILED DESCRIPTION

Hereinafter, one or more embodiments of the present invention will be described with reference to the drawings. However, the scope of the invention is not limited to the disclosed embodiments.

[Configuration of Dynamic Image Analysis System 100]

First, the configuration of this embodiment is described.

Figure 1:
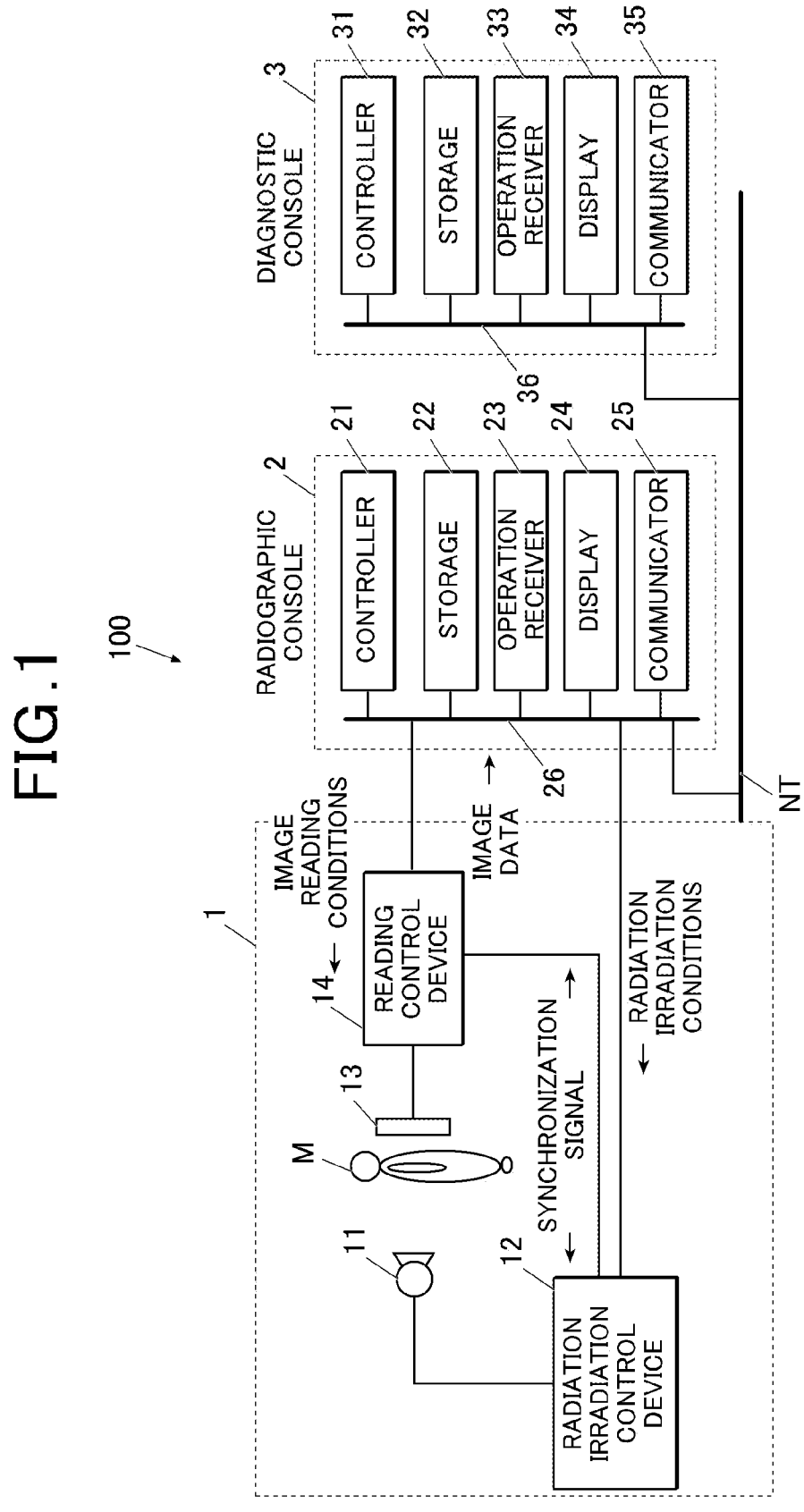
FIG. 1 shows an entire configuration of a dynamic image analysis system according to an embodiment of the present invention.

FIG. 1 shows the entire configuration example of the dynamic image analysis system 100 according to this embodiment.

As shown in FIG. 1, the dynamic image analysis system 100 has the configuration where a radiographing apparatus 1 and a radiographic console 2 are connected to each other by a communication cable or the like, and the radiographic console 2 and a diagnostic console 3 are connected to each other via a communication network NT, such as a LAN (Local Area Network). The apparatuses that constitute the dynamic image analysis system 100 conform to the DICOM (Digital Image and Communications in Medicine) standard, and communication between the apparatuses is performed in conformity with DICOM.

[Configuration of Radiographing Apparatus 1]

The radiographing apparatus 1 is, for example, a modality for radiographing the dynamics of a chest that has a periodicity (cycle), such as of morphological change between pulmonary inflation and deflation accompanying respiratory movement, and heartbeats. Dynamic radiographing means obtainment of a plurality of images indicating the dynamics of a radiographic subject by repeatedly irradiating a radiographic subject with pulsed radiation, such as X-rays, at predetermined time intervals (pulse irradiation), or by seamlessly and continuously irradiating the subject at a low dose rate (continuous irradiation). A series of images obtained by dynamic radiographing is called a dynamic image. Each of the images constituting a dynamic image is called a frame image.

Here, dynamic radiographing encompasses moving image taking, but does not encompass taking of a still image while displaying a moving image. A dynamic image encompasses a moving image but does not encompass an image obtained by taking a still image while displaying a moving image.

As shown in FIG. 1, the radiographing apparatus 1 includes a radiation source 11, a radiation irradiation control device 12, a radiation detector 13, a reading control device 14, and the like.

The radiation source 11 is disposed at a position facing the radiation detector 13 with a radiographic subject M intervening them and irradiates the radiographic subject M with radiation (X-rays) according to control by the radiation irradiation control device 12.

The radiation irradiation control device 12 is connected to the radiographic console 2, controls the radiation source 11 based on radiation irradiation conditions input from the radiographic console 2, and performs radiographing. The radiation irradiation conditions input from the radiographic console 2 are, for example, the pulse rate, pulse width, pulse interval, and the number of radiographic frames per time of radiographing in continuous irradiation, the value of X-ray tube current, the value of X-ray tube voltage, the filter type and the like. The pulse rate is the number of radiation irradiations per second and coincides with a frame rate described later. The pulse width is a radiation irradiation time period per radiation irradiation. The pulse interval is a time period from start of a radiation irradiation to start of the next radiation irradiation in continuous radiographing and coincides with a frame interval described later.

The radiation detector 13 is made up of a semiconductor image sensor, such as an FPD. The FPD includes, for example, a glass substrate and the like. A plurality of detection elements (pixels), each of which detects radiation that has been emitted from the radiation source 11 and passed through at least the radiographic subject M, in accordance with the intensity, and each of which converts the detected radiation into an electric signal and accumulate the signal are arranged in a matrix at predetermined positions on the substrate in the FPD. Each pixel has a configuration that includes, for example, a switcher, such as a TFT (Thin Film Transistor). FPDs include an indirect conversion type that converts X-rays into an electric signal by a photoelectric conversion element through a scintillator, and a direct conversion type that directly converts X-rays into an electric signal. Any of the types may be adopted.

The radiation detector 13 is provided so as to face the radiation source 11 with the radiographic subject M intervening between the radiation detector 13 and the radiation source 11.

The reading control device 14 is connected to the radiographic console 2. The reading control device 14 controls the switcher of each pixel of the radiation detector 13, based on image reading conditions input from the radiographic console 2, sequentially switches reading of the electric signal accumulated in the corresponding pixel, and reads the electric signal accumulated in the radiation detector 13, thus obtaining image data. The image data is a frame image. The reading control device 14 then outputs the obtained frame image to the radiographic console 2. The image reading conditions are, for example, the frame rate, the frame interval, the pixel size, the image size (matrix size), etc. The frame rate is the number of frame images obtained per second and coincides with the pulse rate. The frame interval is a time period from start of an operation of obtaining a frame image to start of the operation of obtaining the next frame image and coincides with the pulse interval.

Here, the radiation irradiation control device 12 and the reading control device 14 are connected to each other, and mutually exchange a synchronization signal and synchronizes the radiation irradiation operation and the image reading operation with each other.

[Configuration of Radiographic Console 2]

The radiographic console 2 outputs the radiation irradiation conditions and the image reading conditions to the radiographing apparatus 1 and controls radiographing by the radiographing apparatus 1 and operation of reading the radiograph, and displays the dynamic image obtained by the radiographing apparatus 1 for the sake of allowing a radiology technologist to confirm positioning and confirm whether the image is suitable for diagnosis or not.

As illustrated in FIG. 1, the radiographic console 2 includes a controller 21, a storage 22, an operation receiver 23, a display 24, and a communicator 25, which are connected to each other by a bus 26.

The controller 21 includes a central processing unit (CPU), a random access memory (RAM), and the like. The CPU of the controller 21 reads system programs and various processing programs stored in the storage 22 and deploys the programs in the RAM in accordance with operation through the operation receiver 23, and executes various processes including a radiographing control process, described later, in accordance with the deployed programs, thus controlling the operation of each component of the radiographic console 2, the radiation irradiation operation of the radiographing apparatus 1, and the reading operation, in a centralized manner.

The storage 22 includes a nonvolatile semiconductor memory, a hard disk, and the like. The storage 22 stores various programs to be executed by the controller 21, parameters required to execute the processes by the programs, and data on processing results and the like. For example, the storage 22 stores programs for executing the radiographing control process shown in FIG. 2. The storage 22 also stores the radiation irradiation conditions and the image reading conditions in association with each test target site. The various programs are stored in a form of readable program code. The controller 21 sequentially executes operation in accordance with the program code.

The operation receiver 23 includes a keyboard including a cursor key, numeric input keys, various function keys, and a pointing device, such as a mouse, and outputs, to the controller 21, an instruction signal input through key operation on the keyboard and mouse operation. The operation receiver 23 may include a touch panel on a display screen of the display 24. In this case, this receiver outputs, to the controller 21, the instruction signal input through the touch panel.

The display 24 is made up of a monitor, such as an LCD (Liquid Crystal Display) or a CRT (Cathode Ray Tube) and displays an input instruction from the operation receiver 23, data and the like in accordance with the instruction of a display signal input from the controller 21.

The communicator 25 includes a LAN adapter, a modem, a TA (Terminal Adapter), or the like, and controls data exchange between apparatuses connected to the communication network NT.

[Configuration of Diagnostic Console 3]

The diagnostic console 3 is a dynamic image analysis apparatus that obtains the dynamic image from the radiographic console 2, applies analysis to the obtained dynamic image, and displays the dynamic image and an analysis result for a doctor's radiographic interpretation.

As illustrated in FIG. 1, the diagnostic console 3 includes a controller 31, a storage 32, an operation receiver 33, a display 34, and a communicator 35, which are connected to each other by a bus 36.

The controller 31 (hardware processor) includes a CPU, a RAM, and the like. The CPU of the controller 31 reads system programs and various processing programs stored in the storage 32 and deploys the programs in the RAM in accordance with operation through the operation receiver 33 and executes various processes including a pulmonary blood flow analysis process, described later, in accordance with the deployed programs, thus controlling the operation of each component of the diagnostic console 3 in a centralized manner. The controller 31 functions as an obtainer, an extractor, a blood flow rate feature amount calculator, a limiter, an analysis region setter, and an analyzer.

The storage 32 includes a nonvolatile semiconductor memory, a hard disk, or the like. The storage 32 stores various programs including a program for allowing the controller 31 to execute the pulmonary blood flow analysis process, parameters required to execute the processes by the programs, and data on processing results and the like. These various programs are stored in a form of readable program code. The controller 31 sequentially executes operation in accordance with the program code.

The operation receiver 33 includes a keyboard including cursor keys, numeric input keys, various function keys, and a pointing device, such as a mouse, and outputs, to the controller 31, an instruction signal input through key operation on the keyboard and mouse operation. The operation receiver 33 may include a touch panel on a display screen of the display 34. In this case, this receiver outputs, to the controller 31, the instruction signal input through the touch panel.

The display 34 is made up of a monitor, such as an LCD or a CRT, and displays an input instruction from the operation receiver 33, data and the like, in accordance with the instruction of a display signal input from the controller 31.

The communicator 35 includes a LAN adapter, a modem, a TA, or the like, and controls data exchange between apparatuses connected to the communication network NT.

[Operation of Dynamic Image Analysis System 100]

Next, operation in the dynamic image analysis system 100 is described.

(Operation of Radiographing Apparatus 1 and Radiographic Console 2)

First, a radiographic operation by the radiographing apparatus 1 and the radiographic console 2 is described.

Figure 2:
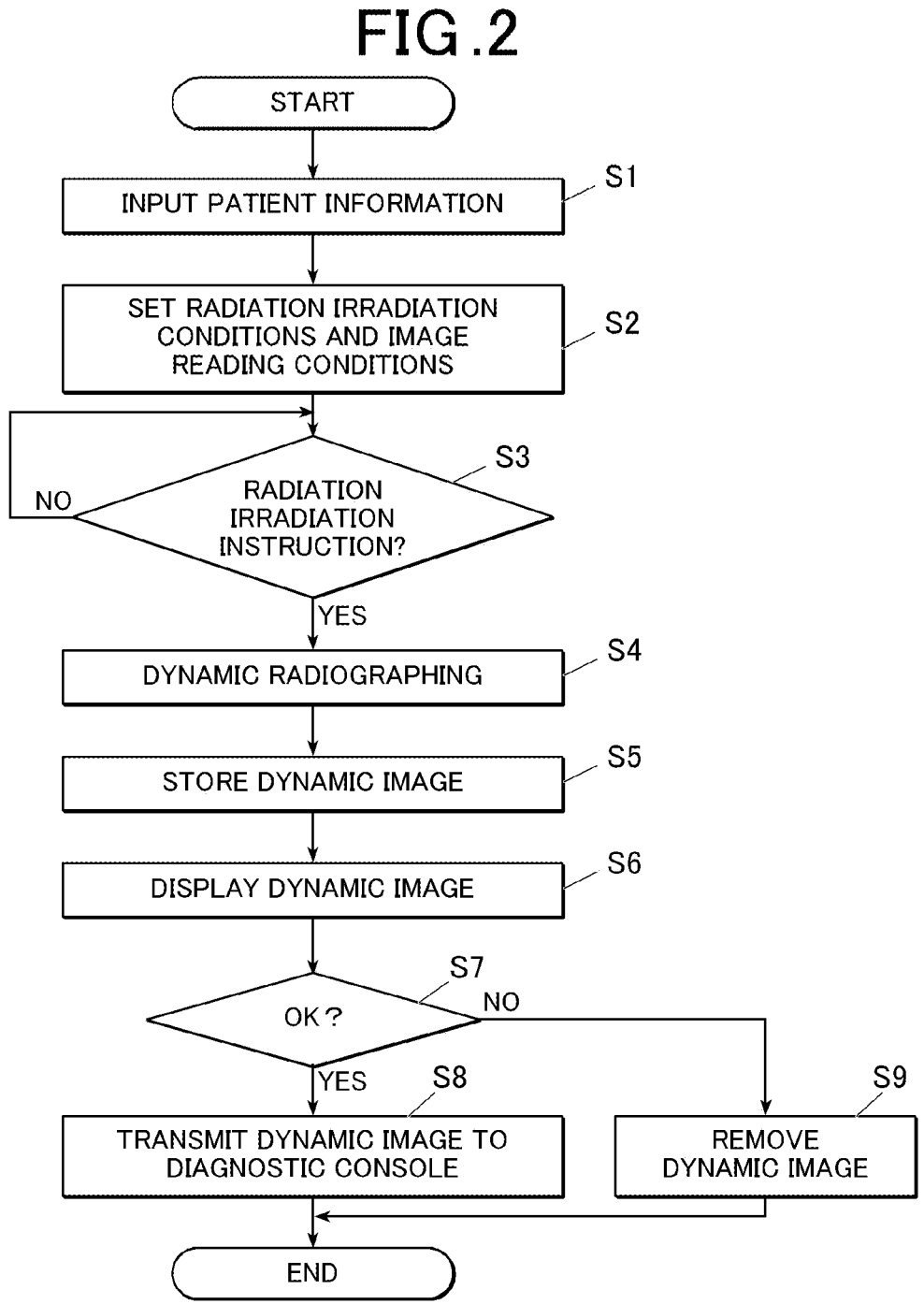
FIG. 2 is a flowchart showing a radiographing control process executed by a controller of a radiographic console in FIG. 1.

FIG. 2 shows the radiographing control process executed by the controller 21 of the radiographic console 2. The radiographing control process is executed by cooperation between the controller 21 and the programs stored in the storage 22.

First, the operation receiver 23 of the radiographic console 2 is operated by the radiology technologist, and patient information (the name, height, weight, age, gender and the like of a patient) on the test subject (radiographic subject M) is input (Step S1).

Next, the radiation irradiation conditions are read from the storage 22, and set in the radiation irradiation control device 12, and the image reading conditions are read from the storage 22 and set in the reading control device 14 (Step S2). Preferably, the frame rate (pulse rate) is herein set to 7.5 frames per second or higher, in consideration of the human heartbeat period. Preferably, the number of radiographed frames is the number of frames in one heartbeat period or longer.

Next, a radiation irradiation instruction by operation through the operation receiver 23 is waited (Step S3). Here, a radiographer, such as a radiology technologist, performs positioning for radiographing a front chest, and instructs the test subject (radiographic subject M) to hold their breath. At a time when radiographic preparations are completed, the radiation irradiation instruction is input through operation on the operation receiver 23.

When the radiation irradiation instruction is input through the operation receiver 23 (Step S3: YES), an instruction for starting radiographing is output to the radiation irradiation control device 12 and the reading control device 14, and dynamic radiographing is started (Step S4). That is, at the pulse interval set in the radiation irradiation control device 12, radiation is emitted from the radiation source 11, and a frame image is obtained by the radiation detector 13. After radiographing of a predefined number of frames is finished, an instruction for finishing radiographing is output by the controller 21 to the radiation irradiation control device 12 and the reading control device 14, and the radiographic operation is stopped. The number of frames to be radiographed is the number allowing at least one heartbeat cycle to be radiographed.

The frame images taken by radiographing are sequentially input into the radiographic console 2, are recorded in the storage 22 in association with numbers indicating the respective radiographing orders (Step S5) and are displayed on the display 24 (Step S6). The radiology technologist confirms positioning and the like by the displayed dynamic image and determines whether an image suitable for diagnosis is taken by radiographing (radiographing OK) or re-radiographing is required (radiographing NG [No Good]). The operation receiver 23 is then operated, and a determination result is input.

When the determination result indicating radiographing OK is input by predetermined operation on the operation receiver 23 (Step S7: YES), information such as an identification ID for identifying the dynamic image, the patient information, the test target site, the radiation irradiation conditions, the image reading conditions, and the number (frame number) indicating the radiographing order are attached to each of the series of frame images obtained by dynamic radiographing (for example, written in the header region of the image data in the DICOM format), and the images are transmitted to the diagnostic console 3 through the communicator 25 (Step S8). The processing is then finished. On the other hand, when a determination result indicating radiographing NG is input by predetermined operation on the operation receiver 23 (Step S7: NO), the series of frame images stored in the storage 22 is removed (Step S9), and the processing is finished.

(Operation of Diagnostic Console 3)

Next, operation in the diagnostic console 3 is described.

Figure 3:
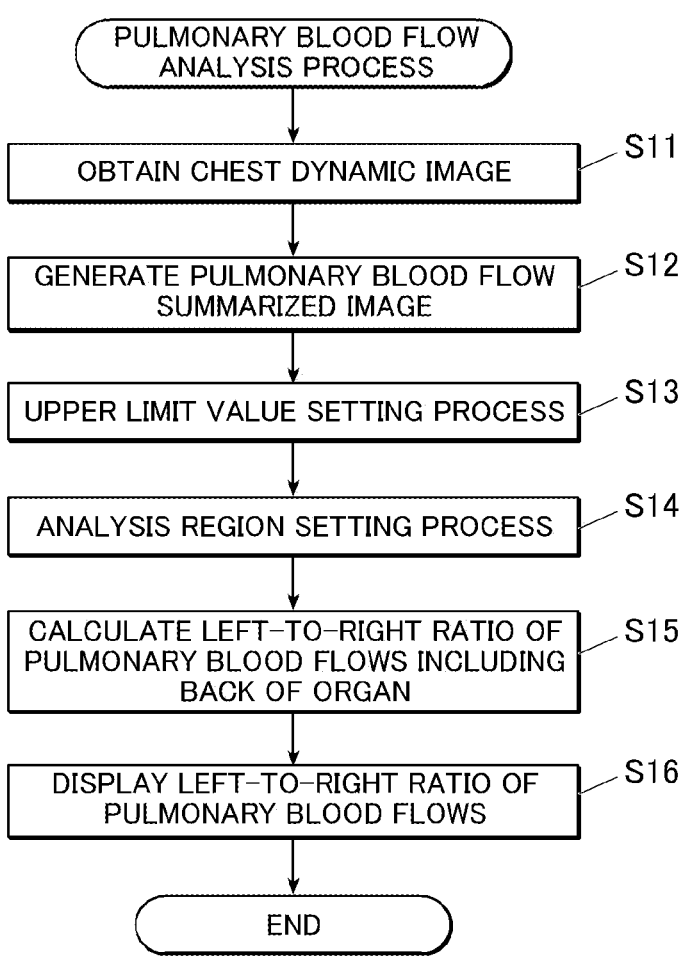
FIG. 3 is a flowchart showing a pulmonary blood flow analysis process executed by a controller of a diagnostic console in FIG. 1.

Upon receipt of the series of frame images of the chest dynamic image from the radiographic console 2 through the communicator 35, the diagnostic console 3 executes the pulmonary blood flow analysis process shown in FIG. 3 through cooperation between the controller 31 and the programs stored in the storage 32. The pulmonary blood flow analysis process calculates the left-to-right ratio of pulmonary blood flows.

Hereinafter, referring to FIG. 3, the flow of the pulmonary blood flow analysis process is described. Hereinafter, the description is made assuming that the chest dynamic image is an image obtained by radiographing the front chest.

First, the series of frame images of the chest dynamic image are obtained (Step S11).

Next, based on the obtained dynamic image, a pulmonary blood flow summarized image is generated (Step S12).

The pulmonary blood flow summarized image is an image that indicates the feature amount about the blood flow rate in each block region (small region) of a lung field region in the chest dynamic image.

The pulmonary blood flow summarized image is generated by the following (1) to (8) processes, for example.

(1) First, a logarithmic conversion process is applied to each frame image of the obtained dynamic image.

Preferably, the logarithmic conversion process is applied; but the process may be omitted.

(2) Lung field regions are extracted from each frame image having already been subjected to the logarithmic conversion process.

The lung field region extracting process may be any method. For example, a threshold is obtained by discrimination analysis from a histogram of pixel values (concentration values) of pixels of the frame image, and a region with a high signal is primarily extracted as a lung field region candidate with reference to the threshold. Next, an edge is detected around a boundary of the primarily extracted lung field region candidate, and the point with the maximum edge in each small block around the boundary is extracted along the boundary, thus allowing the boundary of the lung field region to be extracted.

Note that a frame image assigned the contour, or the like of the lung field region automatically extracted by the method described above may be displayed on the display 34, and a user may be allowed to manually adjust the lung field region through the operation receiver 33.

(3) A block-dividing process is applied to the extracted lung field region in each frame image.

The block-dividing process divides the lung field region into, for example, 10 mm×10 mm rectangular block regions, and replaces the signal value (concentration value) at each pixel in the block region with a representative value (mean etc.) of the signal value in the block region, thus achieving smoothing. Alternatively, a 10 mm×10 mm-sized smoothing process is executed on a pixel-by-pixel basis, and a pixel is set as a block region.

(4) An ROI (region of interest) is set in a heart region, and parameters of a bandpass filter for removing noise at frequencies other than those of the blood flow signal are determined.

First, the ROI is set in the heart region in each frame image. The heart region can be extracted using a publicly known method, such as a method using template matching or deep learning, for example.

Next, the waveform (waveform representing the heartbeat period) indicating the temporal change in the mean signal value of ROI is generated, and the parameters of the bandpass filter are determined based on the frequency of the generated waveform.

(5) The waveform of the temporal change in signal value is obtained with respect to each block region in the lung field region, and the bandpass filter is applied in the temporal direction using the parameters determined in (4).

Accordingly, the effects of noise at frequencies other than those of the blood flow signal can be removed.

(6) A reference frame image is set with respect to each block region having already been subjected to the bandpass filter process.

First, based on the waveform indicating the temporal change in ROI mean signal value, an initial reference frame image is selected. For example, a frame image having the minimum ROI mean signal value is set as the initial reference frame image.

Here, the frame image having the minimum ROI mean signal value (mean concentration value) indicates that the blood quantity in the region regarded as the ROI is the maximum. When blood flows into an organ, radiation is prevented by the blood from passing. Accordingly, the amount of radiation transmission in the radiograph decreases, the signal value decreases, a whitish pattern (i.e., with a low concentration) is represented on the radiograph. In view of the relationship between the cardiac blood flow flowing into and from a heart and the pulmonary blood flow flowing into and from the lung field, when much blood flows into the heart, radiation is prevented from passing through the heart portion. Accordingly, the low signal value shows a relatively whitish pattern (with a low concentration) in the radiograph. On the other hand, at this timing, the quantity of blood flowing into the lung field is small, the amount of radiation transmission is large in the lung field, the signal value in the radiograph is large, and a relatively dark pattern (with a high concentration) is represented. That is, the frame image with the minimum quantity of blood flowing into the lung field is set as the initial reference frame image.

Next, the reference frame image is set with respect to each block region. For example, the frame image indicating the highest signal value in a search range (e.g., in a case of 15 fps, ±0.1333 seconds (two frames therebefore and thereafter) etc.) preset from the initial reference frame image is set as the reference frame image in the block region.

(7) For each frame image, with respect to each block region in the extracted lung field region, the difference value (inter-frame difference value) of the signal value from the corresponding block region (the block region at the same position) in the reference frame image is calculated. The inter-frame difference value represents the amount of change in concentration from the reference frame image and serves as the feature amount about the blood flow rate in each block region in each frame image.

Note that in this embodiment, by subtracting the signal value of the reference frame image from the signal value of each frame image, the inter-frame difference value is calculated. Accordingly, the negative value of the inter-frame difference value indicates the blood flow rate.

(8) Next, the pulmonary blood flow summarized image where the feature amount about the blood flow rate in each block region in each frame image is aggregated is generated.

For example, for each block region, the representative value (any of the integrated value, mean, minimum value, maximum value, and median) of the inter-frame difference value in the temporal direction is extracted, and the pulmonary blood flow summarized image is generated.

After the generation of the pulmonary blood flow summarized image is finished, an upper limit value setting process is applied to the pulmonary blood flow summarized image (Step S13).

Here, in the lung field region in the chest dynamic image, factors of causing change in concentration at the same period as that of the heartbeat include movement of the blood vessel position, change in blood thickness, (change in blood vessel diameter due to pulsation), change in blood density (change in blood concentration (blood pressure)). Among them, the change in concentration due to movement of the blood vessel position is not the change in concentration indicating the blood flow and is noise, and the change in blood thickness and the change in blood density are the change in concentration indicating the blood flow. The change in blood density is estimated as 0.0001% at the maximum. Accordingly, the change in concentration indicating the blood flow can be regarded as the change in blood thickness.

The pulmonary blood flow scintigraphy evaluates the blood flow in peripheral vessels. For blood flow evaluation equivalent to that of the pulmonary blood flow scintigraphy, it is required to remove the change in concentration due to main vessels (the change in blood thickness and the change in density in the main vessels) and to extract the change in blood thickness (change in density) of blood in the peripheral vessels.

That is, the inter-frame difference value that is the signal value in each block region in the pulmonary blood flow summarized image, includes noise, such as change in concentration due to movement of the blood vessel position, and change in concentration due to main vessels, which are required to be removed in order to accurately obtain the change in concentration due to the blood flow similar to that of the pulmonary blood flow scintigraphy. The noise such as change in concentration due to movement of the blood vessel position, and the change in concentration due to main vessels are larger than the change in concentration due to the blood flow in peripheral vessels.

In the upper limit value setting process in Step S13, an upper limit value (an upper limit value of an absolute value) is set for the signal value (inter-frame difference value) in each block region in the pulmonary blood flow summarized image, and in a case of a value exceeding the upper limit value, the value is replaced with the upper limit value and thus a limitation is imposed on the inter-frame difference value, thereby subtracting the change in concentration due to the movement of the blood vessel position and the change in concentration due to main vessels from the inter-frame difference value and accurately calculating the feature amount about the pulmonary blood flow rate.

As described above, in this embodiment, the blood flow rate corresponds to the negative value of the inter-frame difference value. Consequently, if a positive value is used for calculating the blood flow ratio to the blood flow rate as it is, this serves as an error factor. Accordingly, a positive value may herein be replaced with zero.

Here, the upper limit value of the inter-frame difference value can be determined based on a result of a simulation of the signal change at the peripheral vessels accompanying heart's pumping in the chest dynamic image. Alternatively, the upper limit value can be determined based on the obtained result of the signal change of main vessels, from a result of a simulation of the signal change in peripheral vessels accompanying the heart's pumping in the chest dynamic image, and a plurality of chest dynamic images.

Hereinafter, a simulation of signal change by peripheral vessels accompanying heart's pumping in a chest dynamic image is described.

Figure 4:
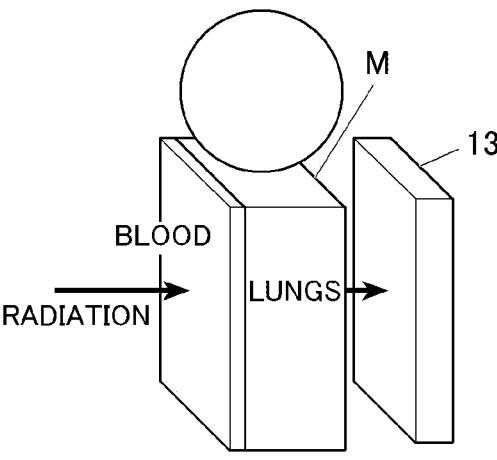
FIG. 4 is a diagram for illustrating a precondition for a simulation of signal change accompanying heart's pumping in a chest dynamic image.

As shown in FIG. 4, as a precondition for the simulation, an amount of blood corresponding to one stroke volume is assumed to be diffused uniformly over the entire lung field. The change in thickness of diffused blood is assumed as signal change of a radiograph.

It has been known that the X-ray dose I after passage through the radiographic subject M can be represented by the following (Expression 1).

$$I = I_0 \times \exp[-\mu \times \rho \times X] \qquad \text{(Expression 1)}$$

Here, $I_0$ is the exposed X-ray dose, $\mu$ is the mass absorption coefficient $[\text{cm}^2/\text{g}]$, $\rho$ is the density $[\text{g/cm}^3]$, and X is the radiographic subject transmission distance [cm].

The signal change rate caused by change in blood thickness according to (Expression 1) described above can be obtained by the following (Expression 2).

$$\text{signal change rate} = (I_0 - I)/I_0 = 1 - \exp[-\mu \times \rho \mu X] \qquad \text{(Expression 2)}$$

The radiographic subject distance X described here is the thickness of blood. It is assumed that one stroke volume is SV, and the lung field size (area in this case) is SL, and according to the precondition described above, the radiographic subject distance X is as follows.

$$X = SV/SL \text{ [cm]}$$

That is, the signal change rate caused by change in blood thickness can be simulated from the values of parameters that are the stroke volume SV, the lung field size SL, the mass absorption coefficient μ, and the density ρ.

The stroke volume SV is the quantity of a blood flow flowing from one heartbeat into the lung field. A standard value may be used as the stroke volume SV. However, if stroke volume information on each test subject is available (for example, if stored in the storage 32 or included in the patient information), it is preferable to use the corresponding value. The stroke volume SV varies depending on the physical feature so that the higher the height is, the larger the volume tends to be, for example. Accordingly, a table that associates at least one physical feature among the height, weight, age, and gender with the stroke volume SV (for example, a value obtained based on statistics etc.) corresponding to the physical feature may be stored in the storage 32, and the stroke volume SV corresponding to the physical feature obtained from the patient information on the test subject may be obtained with reference to the table.

Here, the lung field size SL is the area of the lung field. A standard value may be used as the lung field size SL. However, if information on the lung size of each test subject is available (for example, if stored in the storage 32 or included in the patient information), it is preferable to use the corresponding value. If data allowing measurement of the lung field volume of the test subject M, such as of CT, is available, the volume may be obtained using the measurement data, and the area may be obtained from the obtained volume. For example, the lung field size SL varies depending on the physical feature so that the higher the height is, the larger the size tends to be. Accordingly, a table that associates at least one physical feature among the height, weight, age, and gender with the lung field size SL (for example, a value obtained based on statistics etc.) corresponding to the physical feature may be stored in the storage 32, and the lung size corresponding to the physical feature obtained from the patient information on the test subject may be obtained with reference to the table.

The mass absorption coefficient μ can be determined from the radiographing conditions (the tube voltage, mean energy, etc.) and the site (pulmonary peripheral vessels in this case) serving as a target of calculation of the feature amount about the blood flow rate, based on literature values. That is, the mass absorption coefficient μ for each combination of the radiographing conditions and the site is stored in the storage 32, and the mass absorption coefficient μ in association with the radiographing condition of a chest dynamic image as a processing target and with the site serving as the measurement target (pulmonary peripheral vessels in this case) is read and obtained from the storage 32.

The density ρ can be determined from the site (pulmonary peripheral vessels in this case) serving as the target of calculation of the feature amount about the blood flow rate, based on literature values. That is, the density ρ of the pulmonary peripheral vessels is stored in the storage 32, and the density ρ of the pulmonary peripheral vessels can be read and obtained from the storage 32.

That is, the upper limit value setting process can calculate the signal change rate at the pulmonary peripheral vessels, based on at least the radiographing conditions of the chest dynamic image and on information on blood vessels (pulmonary peripheral vessels) serving as the target of calculation of the feature amount about the blood flow rate, and determine the upper limit value of the feature amount about the blood flow rate, based on the signal change rate. Furthermore, based on at least one or more pieces of information among physical information on the test subject in the chest dynamic image, and the area or the volume of the lung field, the signal change rate at the pulmonary peripheral vessels is calculated, and the upper limit value of the feature amount about the blood flow rate can be determined based on the signal change rate.

For example, in a case where a normal stroke volume ranges from 60 to 130 ml, the standard lung field size is 400 $cm^2$, the mass absorption coefficient obtained from the radiographing conditions and the target site based on the literature is 0.216 $cm^2$/g and the density is 1.056 $g/cm^3$, the signal change rate due to change in blood thickness in peripheral vessels can be estimated as 3.4 to 7.1% by the calculation expression (Expression 2) described above. The upper limit value of the signal change rate due to change in blood thickness can be determined as, for example, 3.4 to 7.1% in accordance with the stroke volume.

As a result of obtaining the signal change rate due to change in thickness at a site of main vessels at a hilar area, and the signal change rate due to movement of main vessels, through visual evaluation of multiple cases of actual chest dynamic images, most of signal change rates due to the change in blood thickness at main vessels at the hilar area were 7.5% or higher, and the signal change rates due to movement of the main vessels were 5% or higher. Accordingly, the upper limit value of the signal change rate may be determined as 5%. As a result of verification, it has been found that the upper limit value is highly correlated with the pulmonary blood flow scintigraphy.

Note that when the radiographing body posture is recumbency, it is conceivable that the blood flow is uniformly dispersed in the lung field as with the precondition described above, and the upper limit value of the signal change rate is made uniform irrespective of the position of the lung field. However, in a case of upright radiographing, it has been known that the blood flow rate is higher at the lower position in the lung field owing to the effect of the gravity. For example, the blood flow ratio between the apex area and the base of the lung is apex area:base=1:10 (see Tatsuo Sakai, Katsumasa Kawahara, "Structure, function and materials of the human body, compilation", Japan Medical Publishers (JMP) Inc., January 2021). When the radiographing body posture is upright, the upper limit value of the signal change rate may be variable depending on the position in the lung field region (position in vertical direction) based on the distribution of blood flow rates. For example, the upper limit value of the signal change rate may be determined depending on the position in the lung field region so that when the upper limit value of the signal change rate at the apex area of the lung is 1, the upper limit value of the signal change rate at the base of the lung is 10.

Figure 5:
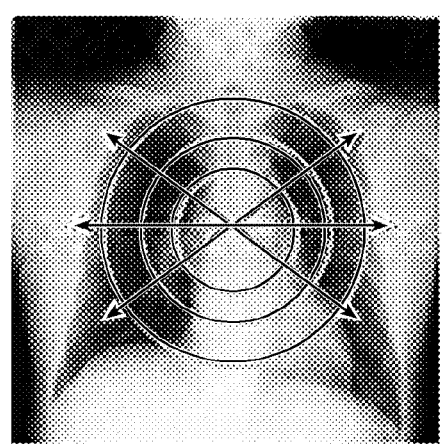
FIG. 5 is a diagram for illustrating an example of setting an upper limit value lower with increase in distance from the center of a lung field.

The blood flow rate decreases from the vicinity of the hilar area toward the outside. Accordingly, the distribution of the blood flow rates may be reflected, and the upper limit value of the signal change rate may be variable depending on the position in the lung field region. For example, as shown in FIG. 5, the upper limit value may be configured to be a smaller value as the position is more distant from the center of the lung field.

In Step S13, when the upper limit value of the signal change rate is determined, the upper limit value of the inter-frame difference value in each block region is calculated by a predetermined calculation expression using the determined upper limit value of the signal change rate, and if the inter-frame difference value is equal to or higher than the upper limit value, the value is replaced with the upper limit value.

Next, an analysis region setting process is executed, and a region obtained by removing, from the lung field region, blood vessels including blood flows flowing to extrapulmonary sites is set as the analysis region for the pulmonary blood flow ratio (Step S14).

Figure 6:
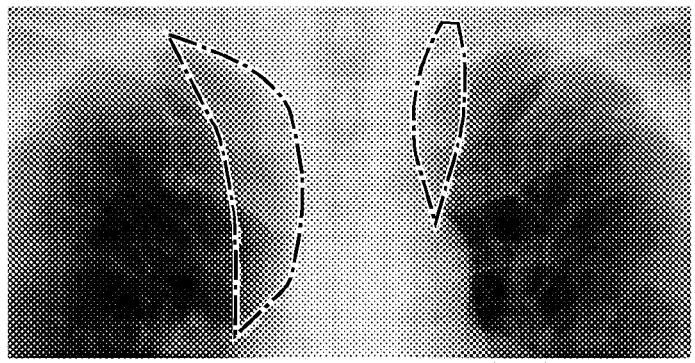
FIG. 6 shows a brachiocephalic artery and a subclavian artery in a chest radiograph.

The brachiocephalic artery and the subclavian artery are overlaid on the lung field region in a two-dimensional image of a front chest and are blood vessels through which blood flows to the extrapulmonary sites. It is difficult to visually identify the blood vessel shapes of these arteries on the chest dynamic image. As indicated by surrounding of chain lines in FIG. 6, it has been found that the arteries are visually identified as regions with reduced concentrations (white regions) on the inner side of the upper part of the typically recognized lung field region, and the signal changes due to blood flows are large and are the blood flows having large effects as noise in evaluation of the pulmonary blood flow.

In Step S14, a region obtained by removing a region affecting the change in concentration due to at least one or more of the brachiocephalic artery and the subclavian artery from the already extracted lung field region in the pulmonary blood flow summarized image is set as the analysis region of the pulmonary blood flow ratio.

The process of setting, as the analysis region, the region obtained by removing, from the lung field region, the region affecting the change in concentration due to one or more of the brachiocephalic artery and the subclavian artery may be performed, for example, using learned model obtained by machine learning, such as deep learning (DL process), or the analysis region may be set by image processing without using machine learning.

Hereinafter, examples of the process in Step S14 are described. The following (A) to (E) are examples of using deep learning, and (F) to (G) are examples of setting the analysis region by image processing without using the machine learning.

Note that in the following description, the lung field region that is typically extracted as a lung field region and includes the brachiocephalic artery and the subclavian artery (e.g., the lung field region extracted in Step S12) is called a lung field mask, and a lung field region obtained by removing the brachiocephalic artery and the subclavian artery is called a lung field mask for the blood flow ratio.

Figure 7:
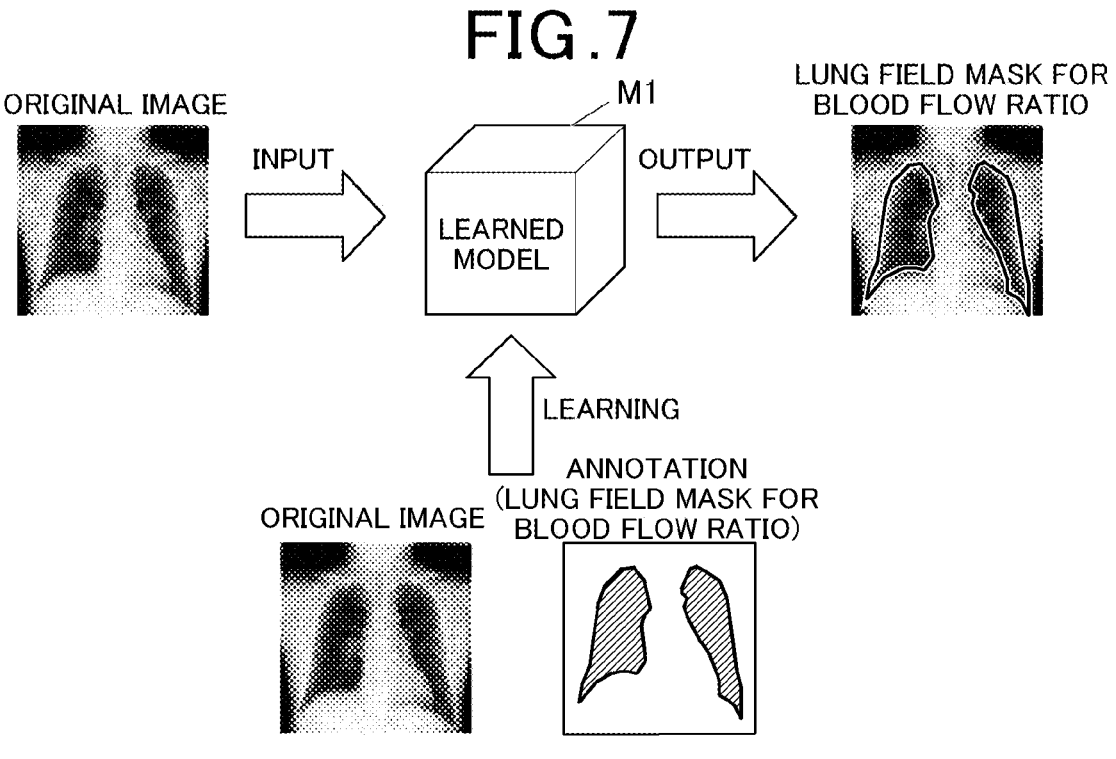
FIG. 7 is a diagram for illustrating an example of a method of generating a lung field mask for a blood flow ratio using deep learning.

(A) As shown in FIG. 7, a learned model M1 that outputs the lung field mask for the blood flow ratio, based on an input chest original image, is preliminarily stored in the storage 32; the model is generated through learning by deep learning, with training data that is sets (multiple sets) each including a chest radiograph (original image), and an image (a correct image of the lung field mask for the blood flow ratio) where a lung field mask for the blood flow ratio is indicated by a doctor or the like through annotation in the original image. For example, in Step S14, an original image (called a representative frame image) of one frame image among frame images of the chest dynamic image is input into the learned model M1, the lung field mask for the blood flow ratio is obtained, and the region of the obtained lung field mask for the blood flow ratio is set as the analysis region.

Figure 8:
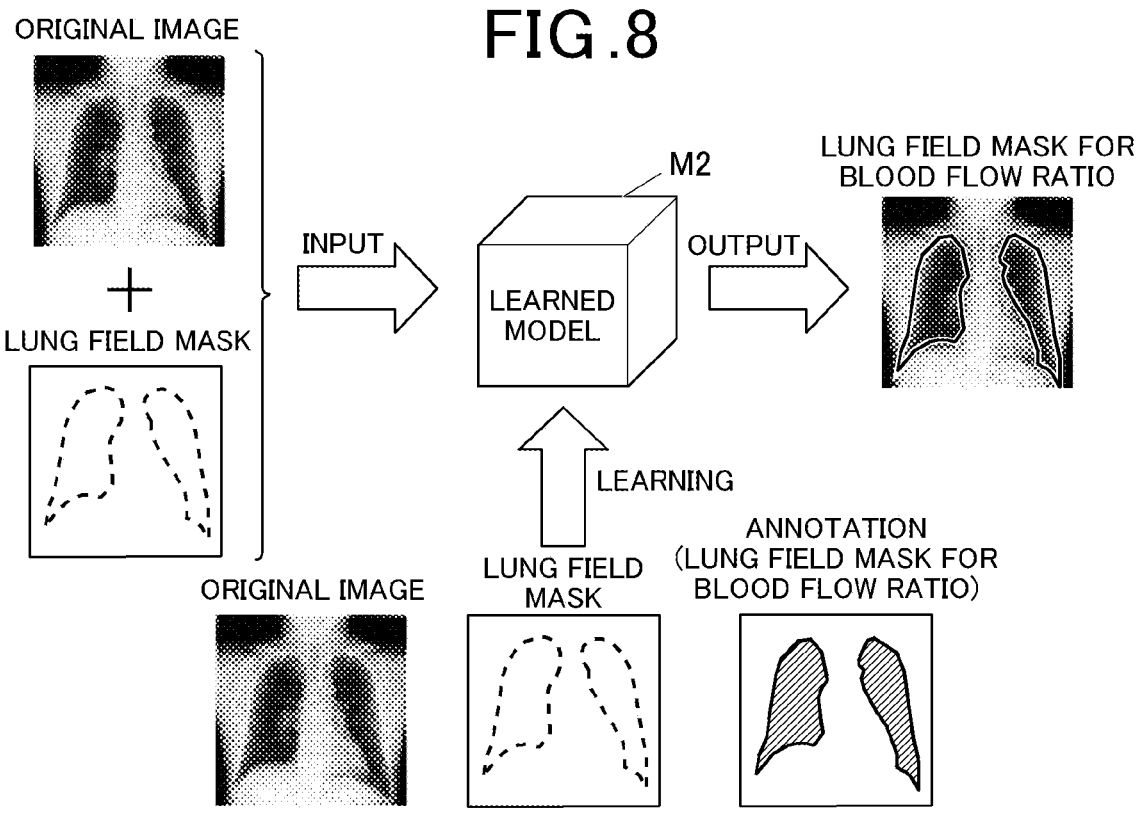
FIG. 8 is a diagram for illustrating an example of a method of generating a lung field mask for a blood flow ratio using deep learning.

(B) As shown in FIG. 8, a learned model M2 that outputs the lung field mask for the blood flow ratio, based on an input chest original image and a lung field mask, is preliminarily stored in the storage 32; the model is generated through learning by deep learning, with training data that is sets (multiple sets) each including a chest radiograph (original image), an image (a result of automatic extraction of the lung field region from the original image may be adopted) where the lung field mask is indicated by a doctor or the like through annotation in the original image, and an image (a correct image of the lung field mask for the blood flow ratio) where a lung field mask for the blood flow ratio is indicated by a doctor or the like through annotation in the original image. For example, in Step S14, the representative frame image and the lung field region (the lung field mask extracted in Step S12) extracted from the frame image are input into the learned model M2, the lung field mask for the blood flow ratio is obtained, and the region of the obtained lung field mask for the blood flow ratio is set as the analysis region.

Figure 9:
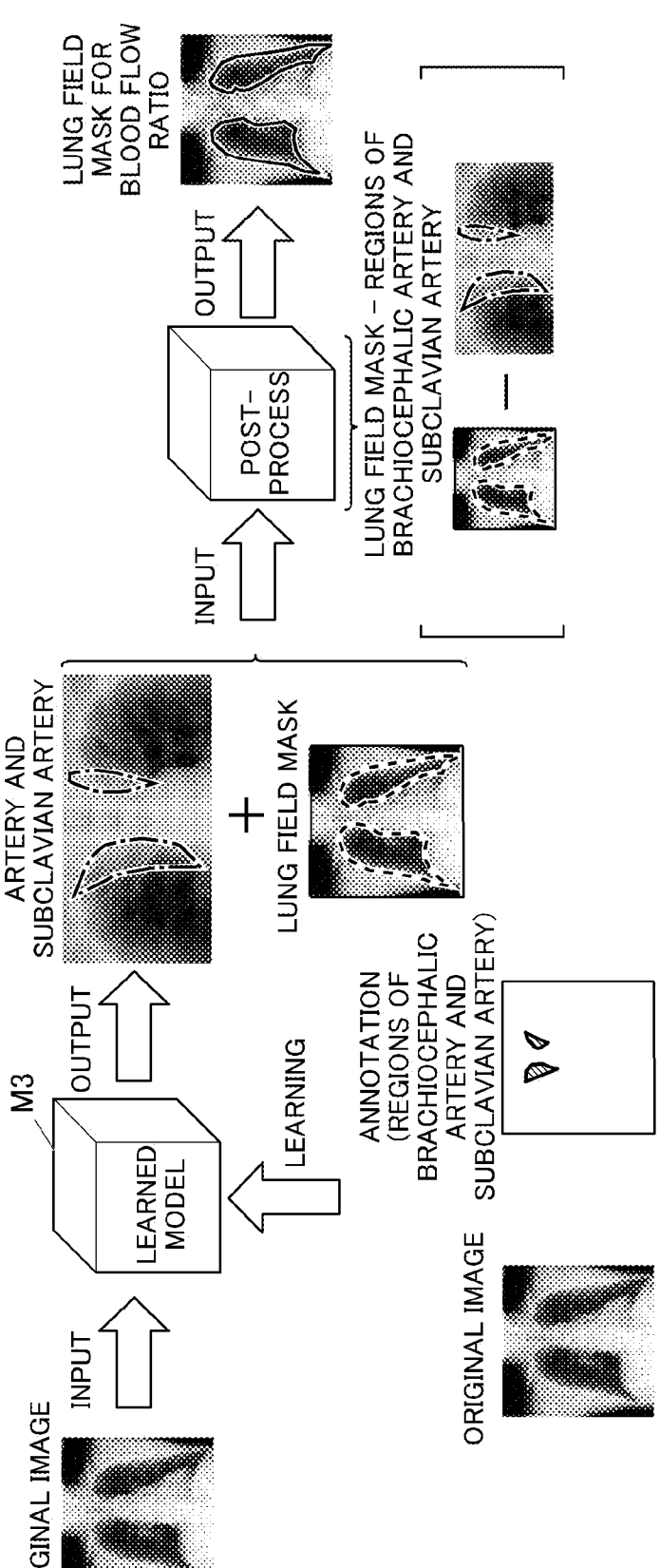
FIG. 9 is a diagram for illustrating an example of a method of generating a lung field mask for a blood flow ratio using deep learning.

(C) As shown in FIG. 9, a learned model M3 that outputs a likelihood map of the brachiocephalic artery and the subclavian artery, based on an input chest original image, is preliminarily stored in the storage 32; the model is generated through learning by deep learning, with training data that is sets (multiple sets) each including a chest radiograph (original image), and an image where a region affected by at least one or more of the brachiocephalic artery and the subclavian artery is indicated by a doctor or the like through annotation in the original image. In Step S14, the representative frame image is input into the learned model M3, the likelihood map of the brachiocephalic artery and the subclavian artery is obtained, and in a post-process, a region obtained by removing a region where the likelihoods of the brachiocephalic artery and the subclavian artery are equal to or higher than a predetermined threshold, from the lung field region (lung field mask) in the representative frame image extracted in Step S12 is obtained as the lung field mask for the blood flow ratio, and the obtained region is set as the analysis region.

Figure 10:
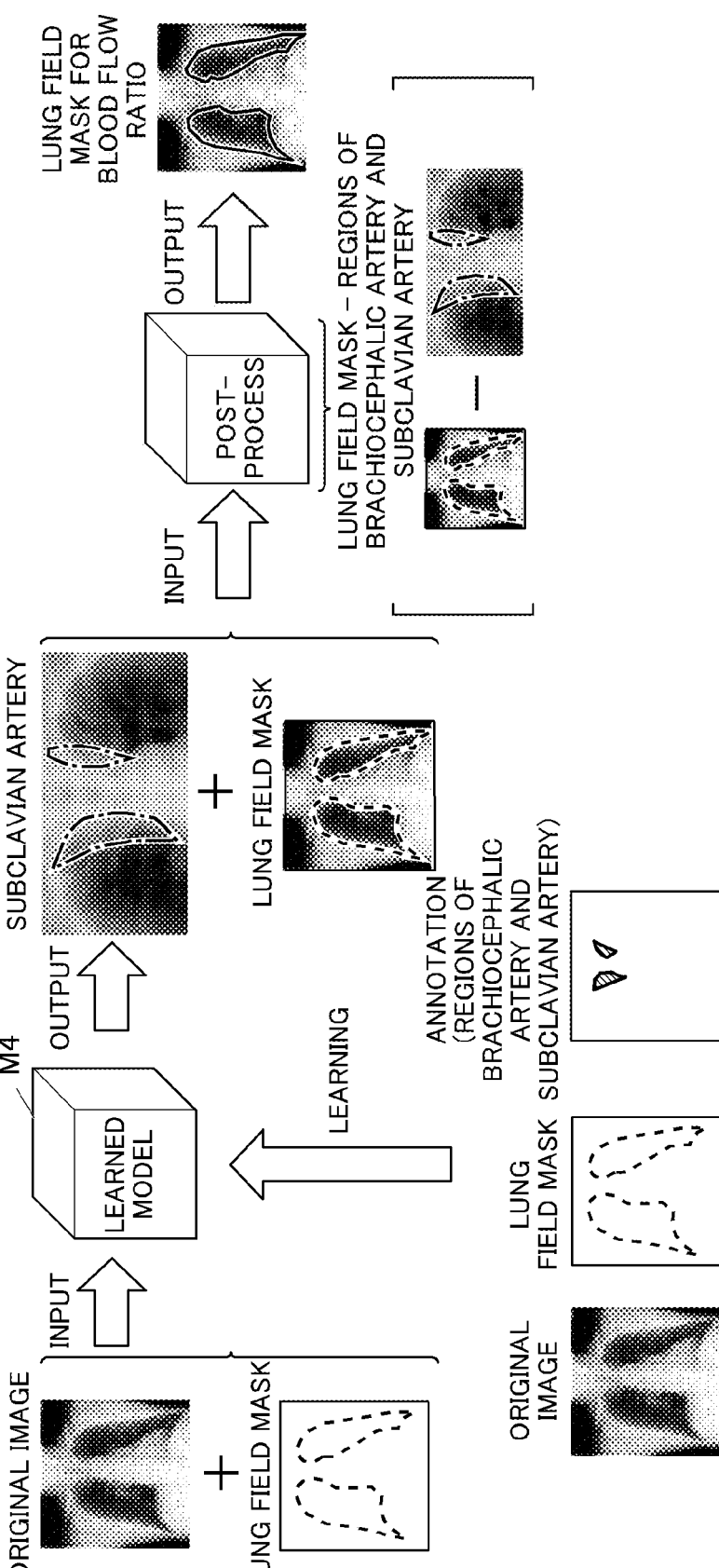
FIG. 10 is a diagram for illustrating an example of a method of generating a lung field mask for a blood flow ratio using deep learning.

(D) As shown in FIG. 10, a learned model M4 that outputs the likelihood map of the brachiocephalic artery and the subclavian artery, based on an input chest original image and a lung field mask, is preliminarily stored in the storage 32; the model is generated through learning by deep learning, with training data that is sets (multiple sets) each including a chest radiograph (original image), an image (a result of automatic extraction of the lung field region from the original image may be adopted) where the lung field mask is indicated by a doctor or the like through annotation in the original image, and an image where a region affected by at least one or more of the brachiocephalic artery and the subclavian artery is indicated by a doctor or the like through annotation in the original image. In Step S14, the representative frame image, and the lung field region (the lung field mask extracted in Step S12) extracted from the frame image are input into the learned model M4, the likelihood map of the brachiocephalic artery and the subclavian artery is obtained, and in a post-process, a region obtained by removing a region where the likelihoods of the brachiocephalic artery and the subclavian artery are equal to or higher than a predetermined threshold, from the lung field mask extracted in Step S12 is obtained as the lung field mask for the blood flow ratio, and the obtained region is set as the analysis region.

Figure 11:
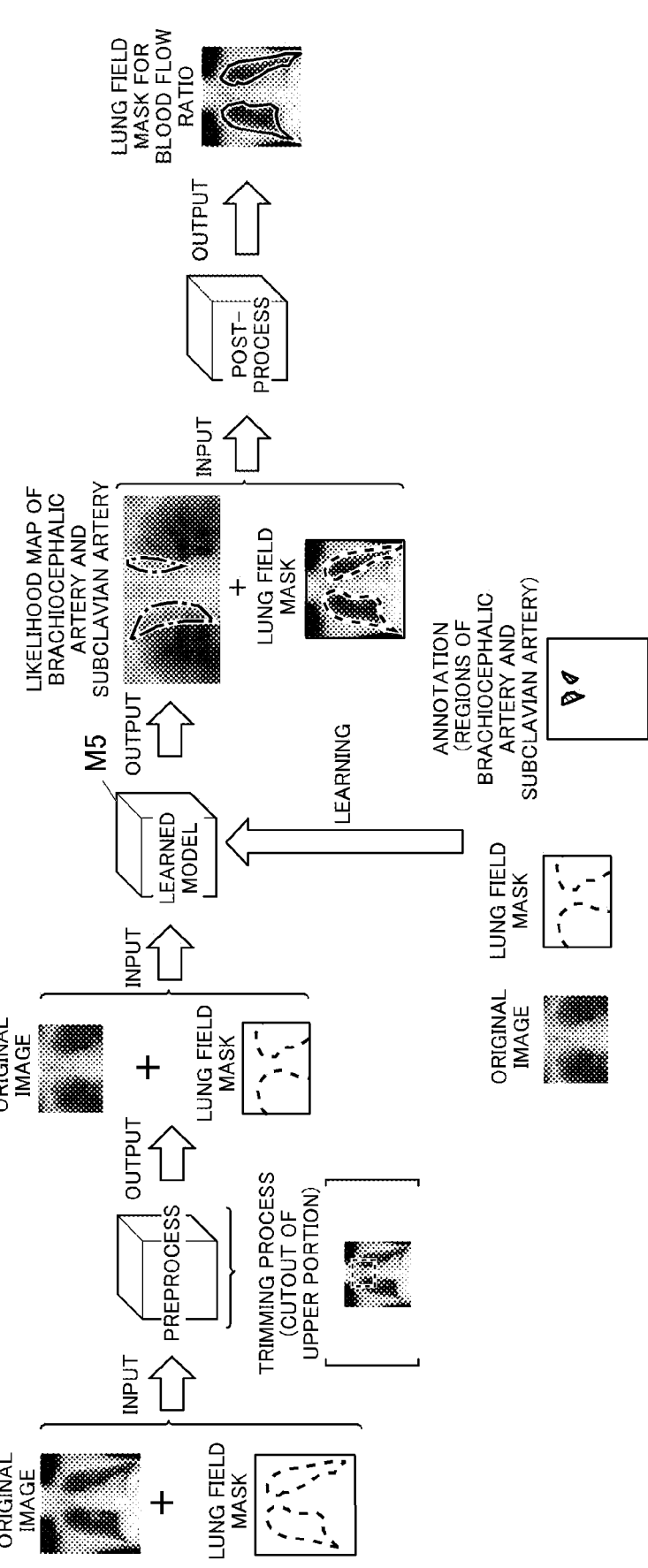
FIG. 11 is a diagram for illustrating an example of a method of generating a lung field mask for a blood flow ratio using deep learning.

(E) It has been known that the brachiocephalic artery and the subclavian artery are present on the inner side of the upper part of the lung field. As shown in FIG. 11, a learned model M5 that outputs the lung field mask for the blood flow ratio, based on an input chest original image and the lung field mask (having been trimmed), is preliminarily stored in the storage 32; the model is generated through learning by deep learning, with training data that is sets (multiple sets) each including a chest radiograph (original image), what is obtained by trimming, from the lung field mask, the region including the brachiocephalic artery and the subclavian artery on the inner side of the upper part of the lung field, and an image where a lung field mask for the blood flow ratio is indicated by a doctor or the like through annotation in the original image. In Step S14, the representative frame image, and a region obtained by trimming the region including the brachiocephalic artery and the subclavian artery on the inner side of the upper part of the lung field region from the lung field region (the lung field mask extracted in Step S12) extracted from the frame image, are input into the learned model M5, the likelihood map of the brachiocephalic artery and the subclavian artery is obtained, and in a post-process, a region obtained by removing a region where the likelihoods of the brachiocephalic artery and the subclavian artery are equal to or higher than a predetermined threshold, from the lung field mask extracted in Step S12 is obtained as the lung field mask for the blood flow ratio, and the obtained region is set as the analysis region.

(F) Based on the concentration information in the lung field region of the representative frame image, the regions of the brachiocephalic artery and the subclavian artery are determined, and a region obtained by removing the brachiocephalic artery and the subclavian artery from the lung field region is set as an analysis region.

Figure 12:
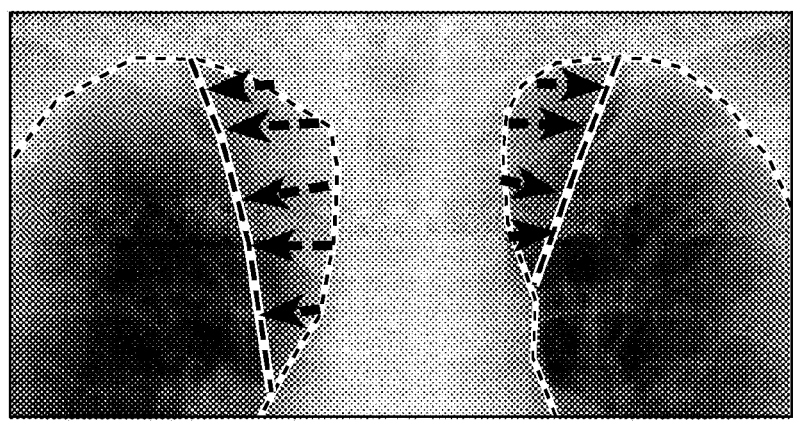
FIG. 12 is a diagram for illustrating setting of an analysis region based on concentration information in the lung field region.

For example, as shown in FIG. 12, in the upper half inner region of the lung field region (the lung field region extracted in Step S12) extracted from the representative frame image, the regions with reduced concentrations (regions with the concentration value (signal value) equal to or less than a predetermined threshold) are reduced inward and the analysis region is set.

(G) From the pulmonary blood flow summarized image and the lung field mask, the regions of the brachiocephalic artery and the subclavian artery are determined, and a region obtained by removing the brachiocephalic artery and the subclavian artery from the lung field region is set as an analysis region.

Figure 13:
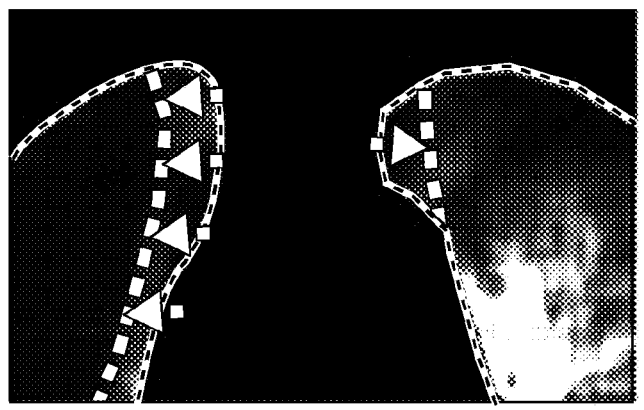
FIG. 13 is a diagram for illustrating setting of an analysis region based on an inter-frame difference value of the lung field region.

For example, as shown in FIG. 13, in the upper half inner region of the lung field region in the pulmonary blood flow summarized image, a region with the inter-frame difference value being equal to or higher than a predetermined threshold is reduced inward, and an analysis region is set.

Here, on the inner side of the upper lung field, the pulmonary blood flow rate is supposed to be low (with a small inter-frame difference value). Since it is assumed that presence of the brachiocephalic artery and the subclavian artery increases the inter-frame difference value in comparison with the pulmonary blood flow rate, a region obtained by removing a region having an inter-frame difference value equal to or higher than the predetermined threshold (a value corresponding to the pulmonary blood flow rate) is set as an analysis region.

The analysis region is larger than the block region and does not include part of the lung field region overlaid on another organ in the chest dynamic image.

Next, the left-to-right ratio of pulmonary blood flows including the back of the organ (the ratio of pulmonary blood flows between the left lung field region and the right lung field region) is calculated (Step S15).

Conventionally, in calculation of the feature amount about the blood flow rate using a chest dynamic image, part of the lung field region (part of the lung field region behind the organ) overlaid on another organ (e.g., the heart, diaphragm, dorsal vertebra, lumbar vertebra, vertebral body, aorta, arteria pulmonalis, aortic arch, etc.) is eliminated from the analysis region and ignored, or it is determined that the signal change in the pulmonary blood flow can be extracted even with recognition that noise of the heart and diaphragm is contained, and the feature amount about the blood flow rate is calculated similarly to the part of lung field region not overlaid on another organ.

However, it has been found that the conventional method has a problem in measurement of the left-to-right ratio of pulmonary blood flows. For example, if the part of lung field region behind the organ is removed from the analysis region, the pulmonary blood flow in the lung field is not entirely considered. Accordingly, there is a problem of occurrence of a difference from the measurement result of the left-to-right ratio of pulmonary blood flows by a currently widely used pulmonary blood flow scintigraphy. If the feature amount about the pulmonary blood flow is extracted and the left-to-right ratio of pulmonary blood flows is measured also in the part of the lung field region behind the organ similarly to the part of the lung field region overlaid on no organ, noise in the feature amount about the pulmonary blood flow calculated from the back of the organ is large, thus causing a problem of occurrence of a difference from the measurement result of the left-to-right ratio of pulmonary blood flows by a currently widely used pulmonary blood flow scintigraphy.

To address such problems, the inventor of the present application has found that for the part of the lung field region behind the organ, instead of actual measurement, presence of the pulmonary blood flow in the same state as in the part of the lung field region overlaid on no organ is assumed in the lung field region behind the organ, a correction value (called an organ back correction coefficient) for correcting the left-to-right ratio of pulmonary blood flows and obtaining the ratio in consideration of the blood flow rate in the part of the lung field region behind the organ is used, the feature amount about the blood flow rate measured in the part of the lung field region not overlaid on another organ is corrected and the left-to-right ratio is calculated, thus achieving a smaller difference from the measurement result of the left-to-right ratio of pulmonary blood flows by a currently widely used pulmonary blood flow scintigraphy.

Accordingly, in Step S15, the organ back correction coefficient is obtained, and the left-to-right ratio of pulmonary blood flows including the back of the organ is calculated using the organ back correction coefficient.

Hereinafter, a method of calculating the organ back correction coefficient is described.

In the chest dynamic image, the left lung field region has a larger region overlaid on another organ than the right lung field region. Accordingly, if the left-to-right ratio of pulmonary blood flows is measured based on the part of the lung field region overlaid on no organ, the blood flow rate in the left lung field region is underestimated in comparison with the right lung field region. In this embodiment, the correction coefficient for correcting this is calculated as the organ back correction coefficient.

Note that the organ back correction coefficient described below is obtained assuming that the pulmonary blood flow in the same state as in the part of the lung field region not overlaid on another organ is present in the part of the lung field region behind the organ in the dynamic image, and the area and the volume of the lung field are proportional to the blood flow rate.

Figure 14:
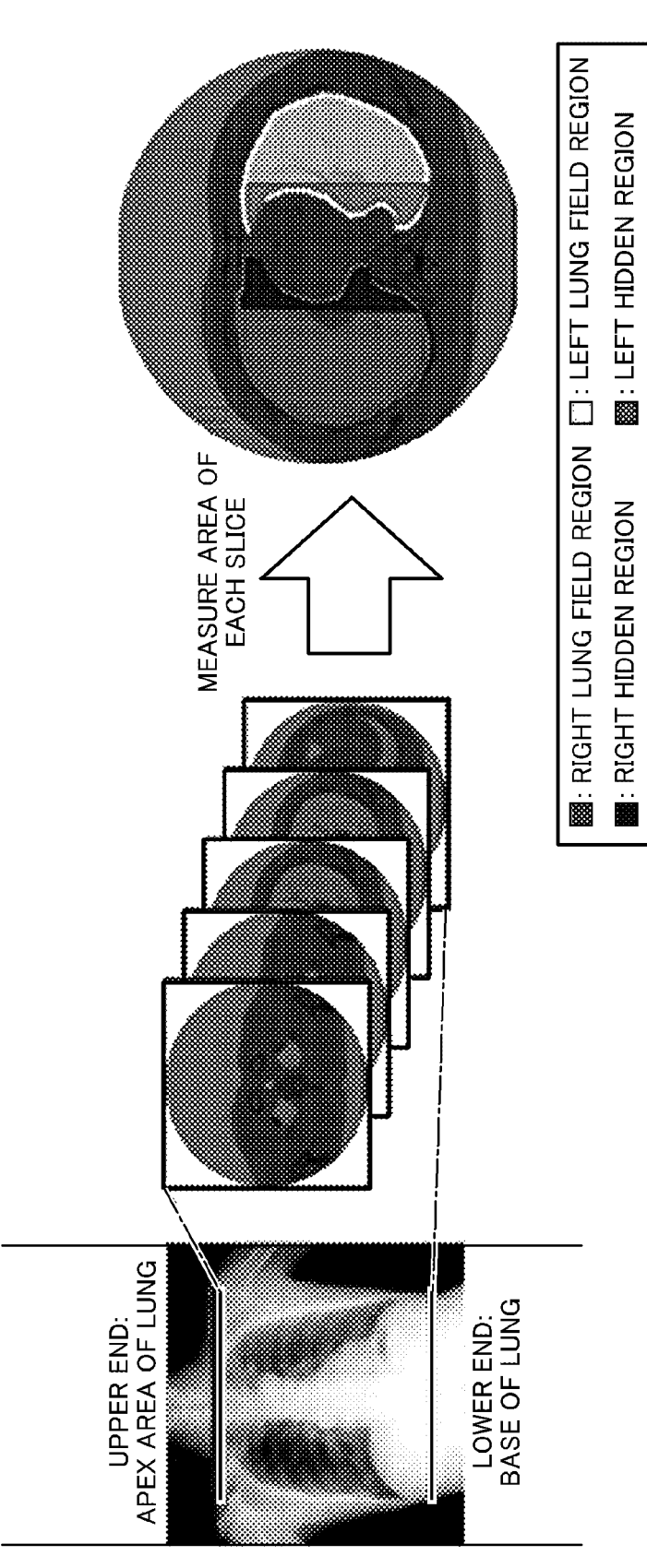
FIG. 14 is a diagram for illustrating a method of calculating the volume of part of a lung field region where the lung field region is overlaid on another organ using a CT image.

Case of Using Volume (a) As shown in FIG. 14, first, a CT image from the apex area of the lung to the base of the lung of a test subject of the chest dynamic image is obtained, for each slice of the CT image, in each of the right lung field region and the left lung field region, the areas of the part of region not overlaid on another organ and the part of region overlaid on another organ (hidden region) in the chest dynamic image (in the radiation irradiation direction during radiographing of the chest dynamic image) are measured.

(b) The areas of the slices are added up, and in each of the right lung field region and the left lung field region, the capacities (volumes) of the region not overlaid on another organ, and the region overlaid on another organ (hidden region) in the chest dynamic image are calculated.

(c) Using the obtained volumes, the organ back correction coefficient is calculated.

As shown in FIG. 15, if the volume of part of the right lung field not overlaid on another organ in the chest dynamic image is assumed as A, and the volume of part of the right lung field overlaid on another organ is assumed as B, the coefficient A' representing the ratio of the volume of the entire right lung field to A is $$A'=(A+B)/A \qquad \text{(Expression 3)}$$

Likewise, if the volume of part of the left lung field not overlaid on another organ in the chest dynamic image is assumed as C, and the volume of part of the left lung field overlaid on another organ is assumed as D, the coefficient C' representing the ratio of the volume of the entire left lung field to C is $$C'=(C+D)/C \qquad \text{(Expression 4)}$$

Provided that the organ back correction coefficient for the right lung field region is 1, the organ back correction coefficient α for the left lung field region is $$\alpha=C'/A'. \qquad \text{(Expression 5)}$$

Case of Using Area

From the chest front image (one frame image of the chest dynamic image may be adopted), the following areas are measured (see FIG. 15).

A: Area of right lung field region not overlaid on another organ

B: Area of right lung field region overlaid on the other organ

C: Area of left lung field region not overlaid on another organ

D: Area of left lung field region overlaid on the other organ

The organ back correction coefficient is obtained by (Expression 3) to (Expression 5) described above.

For example, according to the method using the volume or area described above, without discrimination of physical features, such as the age, gender, height, and weight, the organ back correction coefficient is calculated from multiple case data items on various physical features, the representative value, such as the mean or the median, is preliminarily stored in the storage 32, and in Step S15, the organ back correction coefficient (representative value) stored in the storage 32 is read and obtained.

Alternatively, for each of physical features, such as the age, gender, height, and weight, or a combination of them, the organ back correction coefficient may be calculated, the representative value, such as the mean or the median, is preliminarily stored in the storage 32, and in Step S15, the organ back correction coefficient that corresponds to the physical feature of the test subject and is stored in the storage 32 may be read and obtained.

Alternatively, if in the chest dynamic image, such as the CT image of the test subject of the chest dynamic image, data allowing calculation of the parts of the right lung field region and the left lung field region overlaid on another organ, and parts of the right lung field region and the left lung field region not overlaid on the other organ are present, the individual organ back correction coefficient of the test subject is calculated and obtained.

After the organ back correction coefficient is obtained, the analysis region is divided into a left lung field analysis region and a right lung field analysis region, the representative value (any of the integrated value, mean, minimum value, maximum value, and median) of the inter-frame difference value in each of the left and right analysis regions in the pulmonary blood flow summarized image with the corrected upper limit value is calculated, and the calculated representative value is corrected using the organ back correction coefficient. That is, the organ back correction coefficient for the right lung field region is multiplied to the representative value of the right lung field analysis region, and the organ back correction coefficient for the left lung field region is multiplied to the representative value of the left lung field analysis region. Thus, the left-to-right ratio of pulmonary blood flows to be calculated can be corrected and the ratio in consideration of the blood flow rate of the part of the lung field region behind the organ can be obtained. The ratio of the corrected representative values of the left and right analysis regions is calculated as the left-to-right ratio of pulmonary blood flows.

Note that without correction of the representative value, the left-to-right ratio of pulmonary blood flows may be calculated, and the calculated left-to-right ratio of pulmonary blood flows may be corrected using the organ back correction coefficient.

An analysis result screen 341 where the left-to-right ratio of pulmonary blood flows is displayed is displayed on the display 34 (Step S16), and the pulmonary blood flow analysis process is finished.

FIG. 16 shows an example of the analysis result screen 341. As shown in FIG. 16, a calculated left-to-right ratio of pulmonary blood flows 341a, a pulmonary blood flow summarized image 341b, an applied upper limit value 341c, information 341d indicating whether the lung field mask for the blood flow ratio has been automatically generated or manually generated, information 341e on presence or absence of application of the organ back correction coefficient, and a value 341f of the organ back correction coefficient in the case of presence of application, are displayed on the analysis result screen 341. As the pulmonary blood flow summarized image, an image that is color-coded depending on the inter-frame difference value (i.e., the feature amount about the blood flow rate) is displayed. In the pulmonary blood flow summarized image 341b, a lung field mask for the blood flow ratio 341g is displayed. As for the lung field mask for the blood flow ratio 341g, in order to show consideration of the part of the lung field region behind the organ for calculation of the blood flow ratio, the lung field region is displayed to extend to the back of the organ with respect to the lung field mask for the blood flow ratio 341g1 created in Step S14. Here, as shown in FIG. 16, to show whether it is the back of the organ or not, the region of the lung field mask for the blood flow ratio 341g1 created in Step S14 may be displayed in the lung field mask for the blood flow ratio 341g. Alternatively, as shown in FIG. 17, without discrimination of the region of the back of the organ, only the lung field mask for the blood flow ratio 341g may be displayed.

The upper limit value 341c, the auto/manual 341d of generation of the lung field mask for the blood flow ratio, and the presence or absence 341e of application of the organ back correction coefficient can be changed on the analysis result screen 341.

For example, as shown in FIG. 18, when the upper limit value is changed by operation through the operation receiver 33 by the user, the upper limit value is changed to an input value and the pulmonary blood flow summarized image is created again, the left-to-right ratio of pulmonary blood flows is recalculated, and the value of the left-to-right ratio of pulmonary blood flows 341a and the color-coding on the pulmonary blood flow summarized image 341b on the analysis result screen 341 are changed by the controller 31.

For example, as shown in FIG. 19, when generation of the lung field mask for the blood flow ratio generation is changed from auto to manual by operation on the operation receiver 33 by the user, coordinate points (points indicated by filled circles in FIG. 19) and a cursor 341i are displayed on the lung field mask for the blood flow ratio 341g by the controller 31. The cursor 341i is placed on a coordinate point by the operation receiver 33 and thus moved to a desired point, the left-to-right ratio is recalculated in accordance with the movement of the coordinate point, and the recalculated result is displayed as the left-to-right ratio of pulmonary blood flows 341a.

Figure 20:
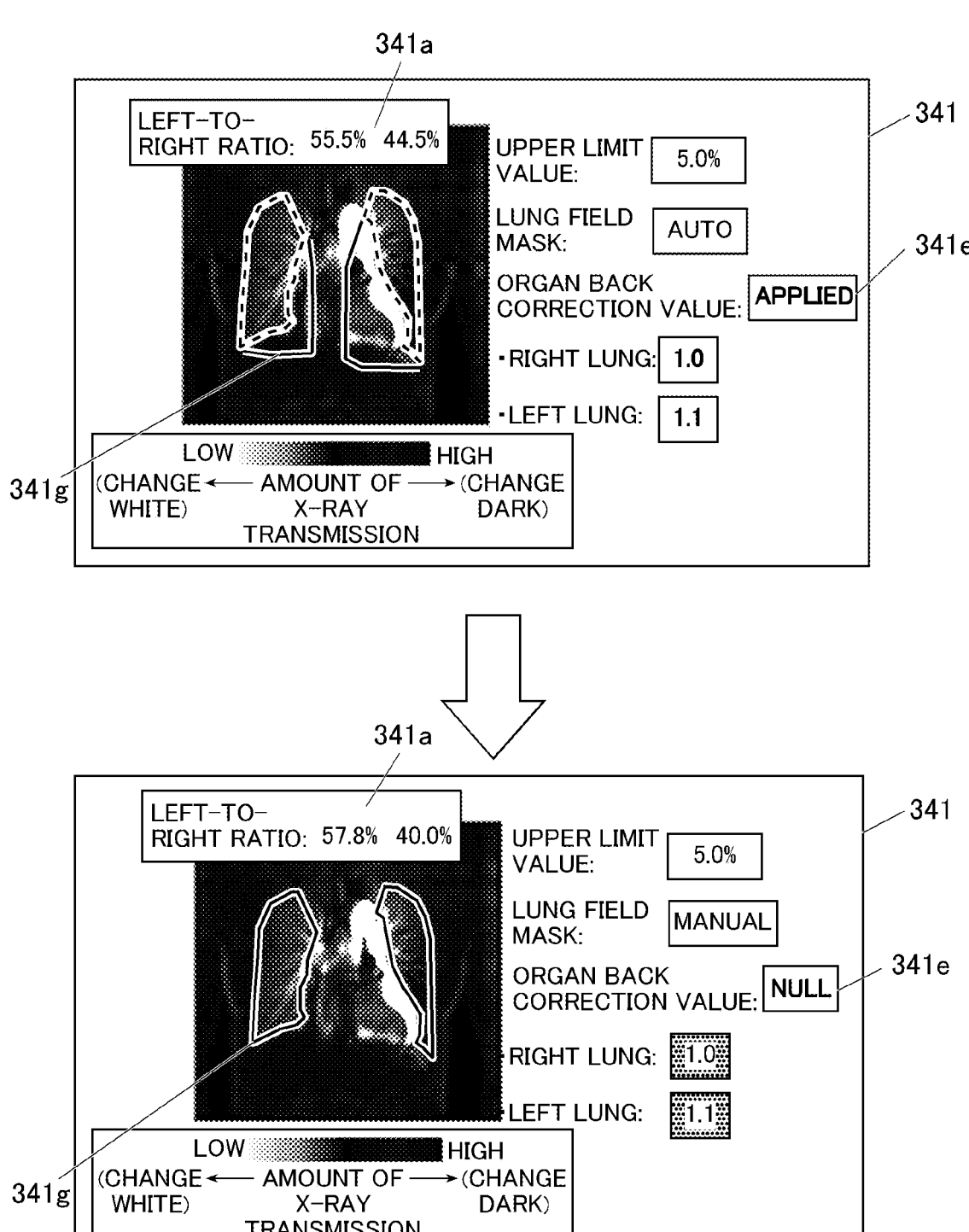
FIG. 20 shows change of the analysis result screen when application of the organ back correction coefficient is changed from applied to null by user operation.

For example, as shown in FIG. 20, when the application of the organ back correction coefficient is changed from presence to absence by the user's operation though the operation receiver 33, the shape of the lung field mask for the blood flow ratio 341g is changed by the controller 31 to that without consideration of the back of the organ. The left-to-right ratio of pulmonary blood flows is recalculated, and a recalculation result is displayed as the left-to-right ratio of pulmonary blood flows 341a.

Figure 21:
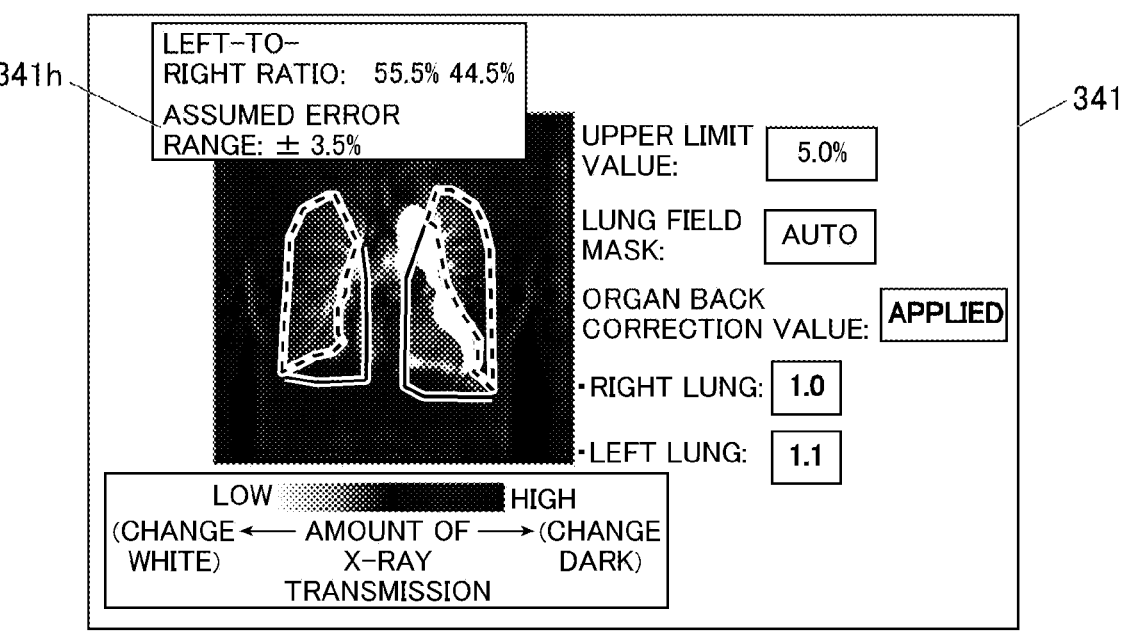
FIG. 21 shows an example of an analysis result screen describing an assumed error of the left-to-right ratio of pulmonary blood flows.

Note that the left-to-right ratio of pulmonary blood flows to which the organ back correction coefficient is applied is a value in the case of assuming "the blood flow in the same state as in the lung field region not overlaid on another organ is present in part of the lung field region behind the organ". Accordingly, there is a possibility that an error is included. As shown in FIG. 21, to allow a margin for determination during diagnosis by a healthcare worker, it is preferable that an assumed error 341h of the left-to-right ratio of pulmonary blood flows be described.

The assumed error can be calculated as in the following (Expression 6), for example.

(right lung value of the left-to-right ratio before application of the organ back correction coefficient−right lung value of the left-to-right ratio after application of the organ back correction coefficient)×1.5    (Expression 6)

A value of 1.5 is applied to allow a margin for the error. Accordingly, a value other than the factor of 1.5 may be newly set.

As described above, the controller 31 of the diagnostic console 3 obtains a chest dynamic image obtained by dynamic radiographing through radiation, extracts the lung field region from the obtained dynamic image, and calculates the feature amount about the blood flow rate (inter-frame difference value) from the extracted the lung field region. The upper limit value of the calculated value of the feature amount about the blood flow rate is determined. A limitation is imposed by the upper limit value of the value of the feature amount about the blood flow rate.

Consequently, the feature amount about the blood flow rate, with the change in concentration due to main vessels having high values being removed from the chest dynamic image, can be calculated. That is, the feature amount about the pulmonary blood flow rate obtained by removing the factor of main vessels can be accurately calculated.

The controller 31 sets the analysis region in the lung field region, and performs analysis based on the feature amount about the blood flow rate calculated in the set analysis region.

For example, a region obtained by removing the region overlaid on the blood flow flowing to extrapulmonary sites from the lung field region, specifically, a region obtained by removing the region affected by change in concentration due to one or more of the brachiocephalic artery and the subclavian artery, is set as the analysis region, and the analysis is performed.

Thus, the region obtained by removing the region overlaid on the blood flow flowing to extrapulmonary sites from the lung field region of the chest dynamic image is set as the analysis region, and the analysis based on the feature amount about the blood flow rate is performed. Consequently, the analysis about the blood flow rate can be accurately performed.

For example, the controller 31 divides the analysis region into a left lung field region and a right lung field region that include a plurality of small regions, and the representative value of the feature amount about the blood flow rate calculated in each divided region is calculated with respect to the region concerned, corrects the calculated representative value, based on the correction value for correction for obtaining the representative value including the feature amount about the blood flow rate in the region overlaid on another organ in the region concerned, and calculates the pulmonary blood flow ratio of the left and right lung fields, based on the corrected representative value.

Consequently, the pulmonary blood flow behind the organ is reflected, and the pulmonary blood flow ratio can be accurately calculated.

Note that the description in the embodiment described above is an example of the preferable dynamic image analysis system according to the present invention. There is no limitation to this.

For example, in the embodiment described above, the pulmonary blood flow summarized image is generated and then the analysis region for calculating the left-to-right ratio of pulmonary blood flows is set, and the left-to-right ratio of pulmonary blood flows is calculated using the inter-frame difference value in the analysis region. Alternatively, after the analysis region is set, the pulmonary blood flow summarized image where the inter-frame difference value in the analysis region is aggregated may be generated, and the left-to-right ratio of pulmonary blood flows may be calculated.

In the aforementioned embodiment, the example of applying the present invention to the case of calculating the left-to-right ratio of pulmonary blood flows is described. However, there is no limitation to this. For example, the blood flow ratios in six regions that include the upper right lung field, middle right lung field, lower right lung field, upper left lung field, middle left lung field, and lower left lung field may be calculated. In this case, as for the organ back correction coefficient, the organ back correction coefficient is calculated in each region from the multiple case data items, and the representative value, such as the mean or the median, is preliminarily stored in the storage 32, and correction is performed using the organ back correction coefficient for the corresponding region.

In the aforementioned embodiment, the description is made using the case of using the inter-frame difference value from the reference frame image as the feature amount about the blood flow rate. However, there is no limitation to this. For example, the cross-correlation coefficient indicating a correlation with the pulsation signal waveform and the signal waveform (the signal waveform in each block region) described in JP 2012-239796A may be adopted as the feature amount about the blood flow rate.

For example, in the above description, the example is disclosed where the hard disk, the semiconductor nonvolatile memory or the like is used as a computer-readable medium for the program according to the present disclosure. However, there is no limitation to this example. As another computer-readable medium, a portable recording medium, such as a CD-ROM, may be applied. Carrier waves are also applicable as a medium of providing data on the program according to the present disclosure via a communication line.

Furthermore, detailed configurations and detailed operation of the respective apparatuses that constitute the dynamic image analysis system 100 can be changed as appropriate within a range not deviating from the spirit of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A dynamic image analysis apparatus, comprising a hardware processor that:

obtains a chest dynamic image obtained by dynamic radiographing through radiation;

extracts a lung field region from the dynamic image;

calculates a feature amount about a blood flow rate, based on the lung field region; and limits a value of the calculated feature amount about the blood flow rate;

wherein the hardware processor determines an upper limit value of the feature amount about the blood flow rate, at least based on a radiographing condition for the dynamic image, and on information on a blood vessel that serves as a calculation target of the feature amount about the blood flow rate, and limits a value of the calculated feature amount about the blood flow rate, based on the upper limit value.

2. The dynamic image analysis apparatus according to claim 1, wherein the hardware processor further determines an upper limit value of the feature amount about the blood flow rate, based on any one of pieces of information about physical information on a test subject in the dynamic image, a radiographing body posture, a position of a target region in which the feature amount about the blood flow rate in the lung field region is calculated, and an area or a volume of a lung field in which the feature amount about the blood flow rate is calculated, and limits a value of the calculated feature amount about the blood flow rate, based on the upper limit value.

3. The dynamic image analysis apparatus according to claim 1, wherein the hardware processor sets an analysis region in the lung field region, and performs analysis, based on the feature amount about the blood flow rate calculated in the analysis region.

4. The dynamic image analysis apparatus according to claim 3, wherein the analysis region is a region obtained by removing, from the lung field region, a region overlaid on a blood flow flowing to an extrapulmonary site.

5. The dynamic image analysis apparatus according to claim 4, wherein the region removed to obtain the analysis region is a region affected by change in concentration due to any one or more of a brachiocephalic artery and a subclavian artery.

6. The dynamic image analysis apparatus according to claim 3, wherein the hardware processor calculates the feature amount about the blood flow rate, for each small region in the lung field region, sets, in the lung field region, an analysis region that includes a plurality of small regions, and divides the analysis region into a plurality of regions that include the plurality of small regions, calculates a representative value of the feature amount about the blood flow rate calculated in a region concerned in each of the divided regions, and calculates a ratio of the calculated representative value of the plurality of regions, as a blood flow ratio of the plurality of regions, and the hardware processor further obtains a correction value for correcting the ratio and obtaining a ratio in consideration of a blood flow rate in part of the lung field region overlaid on another organ, and corrects the ratio, based on the obtained correction value.

7. The dynamic image analysis apparatus according to claim 6, wherein the correction value is a value calculated based on a volume or an area of the part of the lung field region overlaid on another organ in a radiation irradiation direction during taking the dynamic image.

8. A non-transitory computer readable recording medium storing a program causing a computer to perform:

obtaining a chest dynamic image obtained by dynamic radiographing through radiation;

extracting a lung field region from the dynamic image;

calculating a feature amount about a blood flow rate, based on the lung field region;

limiting a value of the calculated feature amount about the blood flow rate; and determining an upper limit value of the feature amount about the blood flow rate, at least based on a radiographing condition for the dynamic image, and on information on a blood vessel that serves as a calculation target of the feature amount about the blood flow rate, and limits a value of the calculated feature amount about the blood flow rate, based on the upper limit value.

* * * * *